US012591847B2

(12) United States Patent
Chen et al.

(10) Patent No.: US 12,591,847 B2
(45) Date of Patent: Mar. 31, 2026

(54) SYSTEMS AND METHODS OF TRANSFORMING IMAGE DATA TO PRODUCT STORAGE FACILITY LOCATION INFORMATION

(71) Applicant: Walmart Apollo, LLC, Bentonville, AR (US)

(72) Inventors: Yilun Chen, Dallas, TX (US); Ravi Kumar Dalal, Dallas, TX (US); Adam Cantor, Austin, TX (US); Monisha Elumalai, Dallas, TX (US); Benjamin R. Ellison, San Francisco, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 459 days.

(21) Appl. No.: 17/963,751

(22) Filed: Oct. 11, 2022

(65) Prior Publication Data

US 2024/0119408 A1      Apr. 11, 2024

(51) Int. Cl.
*G06Q 10/087*        (2023.01)
*G06T 5/73*          (2024.01)
(Continued)

(52) U.S. Cl.
CPC ............. *G06Q 10/087* (2013.01); *G06T 5/73* (2024.01); *G06T 7/11* (2017.01); *G06V 10/75* (2022.01);
(Continued)

(58) Field of Classification Search
CPC .................... G06Q 10/087; G06T 5/73; G06T 2207/20081; G06T 2207/20132;
(Continued)

(56) References Cited

U.S. PATENT DOCUMENTS 5,074,594 A    12/1991 Laganowski
6,570,492 B1   5/2003 Peratoner
(Continued)

FOREIGN PATENT DOCUMENTS

CN    106347550 B    8/2019
CN    110348439 B    10/2019
(Continued)

OTHER PUBLICATIONS

X. Zhang, M. Chen and D. Wu, "Industrial Character Image Motion Deblurring and Target Region Dynamic Location Method," 2022 5th International Conference on Pattern Recognition and Artificial Intelligence (PRAI), Chengdu, China, 2022, pp. 658-663, doi: 10.1109/PRAI55851.2022.9904077. (Year: 2022).*
(Continued)

*Primary Examiner* — Matthew C Bella
*Assistant Examiner* — Janice E. Vaz
(74) *Attorney, Agent, or Firm* — Foley IP Law, PLLC

(57)            ABSTRACT

Some embodiments provide systems comprising: a machine learning model database; a deblur system configured to receive at least a portion of an image comprising a presumed location label captured by the image capture device, and apply at least a deblurring machine learning framework to generate a deblurred label image comprising the presumed location label; a rectification system configured to apply an machine learning transform algorithm to the deblurred label image to generate a rectified label image; an optical character recognition (OCR) system configured to apply a recognition machine learning model to the rectified label image to estimate text; and a location estimation system configured to estimate a location of the presumed location label as a function of the estimated text of the presumed location label relative to known text on known location labels position at
(Continued)

respective different known locations within the product storage facility.

18 Claims, 9 Drawing Sheets

(51) Int. Cl.

| | |
|---|---|
| G06T 7/11 | (2017.01) |
| G06V 10/75 | (2022.01) |
| G06V 20/00 | (2022.01) |
| G06V 20/62 | (2022.01) |
| G06V 30/148 | (2022.01) |

(52) U.S. Cl.

CPC .............. *G06V 20/36* (2022.01); *G06V 20/62* (2022.01); *G06V 30/153* (2022.01); *G06T 2207/20081* (2013.01); *G06T 2207/20132* (2013.01)

(58) Field of Classification Search

CPC ...... G06V 20/36; G06V 20/62; G06V 30/153; G06V 10/82; G06V 20/63; G06V 30/10

See application file for complete search history.

(56) References Cited

U.S. PATENT DOCUMENTS

| | | | |
|---|---|---|---|
| 8,923,650 | B2 | 12/2014 | Wexler |
| 8,965,104 | B1 | 2/2015 | Hickman |
| 9,275,308 | B2 | 3/2016 | Szegedy |
| 9,477,955 | B2 | 10/2016 | Goncalves |
| 9,526,127 | B1 | 12/2016 | Taubman |
| 9,576,310 | B2 | 2/2017 | Cancro |
| 9,659,204 | B2 | 5/2017 | Wu |
| 9,811,754 | B2 | 11/2017 | Schwartz |
| 10,002,344 | B2 | 6/2018 | Wu |
| 10,019,803 | B2 | 7/2018 | Venable |
| 10,032,072 | B1 | 7/2018 | Tran |
| 10,129,524 | B2 | 11/2018 | Ng |
| 10,210,432 | B2 | 2/2019 | Pisoni |
| 10,373,116 | B2 | 8/2019 | Medina |
| 10,572,757 | B2 | 2/2020 | Graham |
| 10,592,854 | B2 | 3/2020 | Schwartz |
| 10,839,452 | B1 | 11/2020 | Guo |
| 10,922,574 | B1 | 2/2021 | Tariq |
| 10,943,278 | B2 | 3/2021 | Benkreira |
| 10,956,711 | B2 | 3/2021 | Adato |
| 10,990,950 | B2 | 4/2021 | Garner |
| 10,991,036 | B1 | 4/2021 | Bergstrom |
| 11,036,949 | B2 | 6/2021 | Powell |
| 11,055,905 | B2 | 7/2021 | Tagra |
| 11,087,272 | B2 | 8/2021 | Skaff |
| 11,151,426 | B2 | 10/2021 | Dutta |
| 11,163,805 | B2 | 11/2021 | Arocho |
| 11,276,034 | B2 | 3/2022 | Shah |
| 11,282,287 | B2 | 3/2022 | Gausebeck |
| 11,295,163 | B1 * | 4/2022 | Schoner .............. G06V 10/751 |
| 11,308,775 | B1 | 4/2022 | Sinha |
| 11,409,977 | B1 | 8/2022 | Glaser |
| 11,481,683 | B1 * | 10/2022 | Singh ........................ G06N 5/04 |
| 2005/0238465 | A1 | 10/2005 | Razumov |
| 2011/0040427 | A1 | 2/2011 | Ben-Tzvi |
| 2014/0002239 | A1 | 1/2014 | Rayner |
| 2014/0247116 | A1 | 9/2014 | Davidson |
| 2014/0307938 | A1 | 10/2014 | Doi |
| 2015/0363660 | A1 | 12/2015 | Vidal |
| 2016/0203525 | A1 | 7/2016 | Hara |
| 2017/0106738 | A1 | 4/2017 | Gillett |
| 2017/0286773 | A1 | 10/2017 | Skaff |
| 2018/0005176 | A1 | 1/2018 | Williams |
| 2018/0018788 | A1 | 1/2018 | Olmstead |
| 2018/0197223 | A1 | 7/2018 | Grossman |
| 2018/0260772 | A1 | 9/2018 | Chaubard |
| 2019/0025849 | A1 | 1/2019 | Dean |
| 2019/0043003 | A1 | 2/2019 | Fisher |
| 2019/0050932 | A1 | 2/2019 | Dey |
| 2019/0087772 | A1 | 3/2019 | Medina |
| 2019/0163698 | A1 | 5/2019 | Kwon |
| 2019/0197561 | A1 | 6/2019 | Adato |
| 2019/0220482 | A1 | 7/2019 | Crosby |
| 2019/0236531 | A1 | 8/2019 | Adato |
| 2020/0246977 | A1 | 8/2020 | Swietojanski |
| 2020/0265494 | A1 | 8/2020 | Glaser |
| 2020/0324976 | A1 | 10/2020 | Diehr |
| 2020/0356813 | A1 | 11/2020 | Sharma |
| 2020/0380226 | A1 | 12/2020 | Rodriguez |
| 2020/0387858 | A1 | 12/2020 | Hasan |
| 2021/0049541 | A1 | 2/2021 | Gong |
| 2021/0049542 | A1 | 2/2021 | Dalal |
| 2021/0142105 | A1 | 5/2021 | Siskind |
| 2021/0150231 | A1 | 5/2021 | Kehl |
| 2021/0192780 | A1 | 6/2021 | Kulkarni |
| 2021/0216954 | A1 | 7/2021 | Chaubard |
| 2021/0272269 | A1 | 9/2021 | Suzuki |
| 2021/0319684 | A1 | 10/2021 | Ma |
| 2021/0342914 | A1 | 11/2021 | Dalal |
| 2021/0400195 | A1 | 12/2021 | Adato |
| 2022/0043547 | A1 | 2/2022 | Jahjah |
| 2022/0051179 | A1 | 2/2022 | Savvides |
| 2022/0058425 | A1 | 2/2022 | Savvides |
| 2022/0067085 | A1 | 3/2022 | Nihas |
| 2022/0114403 | A1 | 4/2022 | Shaw |
| 2022/0114821 | A1 | 4/2022 | Arroyo |
| 2022/0138914 | A1 | 5/2022 | Wang |
| 2022/0165074 | A1 | 5/2022 | Srivastava |
| 2022/0222924 | A1 | 7/2022 | Pan |
| 2022/0262008 | A1 | 8/2022 | Kidd |
| 2023/0005108 | A1 * | 1/2023 | Gopalkrishna ...... H04N 5/2723 |
| 2024/0394854 | A1 * | 11/2024 | Koo ........................ G06N 20/00 |

FOREIGN PATENT DOCUMENTS

| | | |
|---|---|---|
| CN | 110443298 B | 2/2022 |
| CN | 114898358 A | 8/2022 |
| EP | 3217324 A1 | 9/2017 |
| EP | 3437031 | 2/2019 |
| EP | 3479298 | 5/2019 |
| WO | 2006113281 A2 | 10/2006 |
| WO | 2017201490 A1 | 11/2017 |
| WO | 2018093796 | 5/2018 |
| WO | 2020051213 A1 | 3/2020 |
| WO | 2021186176 A1 | 9/2021 |
| WO | 2021247420 A2 | 12/2021 |

OTHER PUBLICATIONS

P. Jadhav et al., "Pix2Pix Generative Adversarial Network with ResNet for Document Image Denoising," 2022 4th International Conference on Inventive Research in Computing Applications (ICIRCA), Coimbatore, India, 2022, pp. 1489-1494, doi: 10.1109/ICIRCA54612.2022.9985695. (Year: 2022).*

N. Jaiswal and Y. K. Meghrajani, "Saliency based automatic image cropping using support vector machine classifier," 2015 International Conference on Innovations in Information, Embedded and Communication Systems (ICIIECS), Coimbatore, India, 2015, pp. 1-5, doi: 10.1109/ICIIECS.2015.7193184. (Year: 2015).*

U.S. Appl. No. 17/963,787, filed Oct. 11, 2022, Lingfeng Zhang.

U.S. Appl. No. 17/963,802, filed Oct. 11, 2022, Lingfeng Zhang.

U.S. Appl. No. 17/963,903, filed Oct. 11, 2022, Raghava Balusu.

U.S. Appl. No. 17/966,580, filed Oct. 14, 2022, Paarvendhan Puviyarasu.

U.S. Appl. No. 17/971,350, filed Oct. 21, 2022, Jing Wang.

U.S. Appl. No. 17/983,773, filed Nov. 9, 2022, Lingfeng Zhang.

Chaudhuri, Abon et al.; "A Smart System for Selection of Optimal Product Images in E-Commerce"; 2018 IEEE Conference on Big Data (Big Data); Dec. 10-13, 2018; IEEE; <https://ieeexplore.ieee.org/document/8622259>; pp. 1728-1736.

Chenze, Brandon et al.; "Iterative Approach for Novel Entity Recognition of Foods in Social Media Messages"; 2022 IEEE 23rd

(56) References Cited

OTHER PUBLICATIONS

International Conference on Information Reuse and Integration for Data Science (IRI); Aug. 9-11, 2022; IEEE; <https://ieeexplore.ieee.org/document/9874231>; pp. 126-131.

Naver Engineering Team; "Auto-classification of NAVER Shopping Product Categories using TensorFlow"; <https://blog.tensorflow.org/2019/05/auto-classification-of-naver-shopping.html>; May 20, 2019; pp. 1-13.

Paolanti, Marine et al.; "Mobile robot for retail surveying and inventory using visual and textual analysis of monocular pictures based on deep learning"; European Conference on Mobile Robots; Sep. 2017, 6 pages.

Ramanpreet Kaur et al.; "A Brief Review on Image Stitching and Panorama Creation Methods"; International Journal of Control Theory and Applications; 2017; vol. 10, No. 28; International Science Press; Gurgaon, India; <https://www.researchgate.net/publication/348232877 >; 11 pages.

Refills; "Final 3D object perception and localization"; European Commision, Dec. 31, 2016, 16 pages.

Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.

Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.

Singh, Ankit; "Automated Retail Shelf Monitoring Using AI"; <https://blog.paralleldots.com/shelf-monitoring/automated-retail-shelf-monitoring-using-ai/>; Sep. 20, 2019; pp. 1-12.

Singh, Ankit; "Image Recognition and Object Detection in Retail"; <https://blog.paralleldots.com/featured/image-recognition-and-object-detection-in-retail/>; Sep. 26, 2019; pp. 1-11.

Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; pp. 10778-10787.

Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.

Technology Robotix Society; "Colour Detection"; < https://medium.com/image-processing-in-robotics/colour-detection-e15bc03b3f61>; Jul. 2, 2019; pp. 1-8.

Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.

Trax Retail; "Image Recognition Technology for Retail | Trax"; < https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.

USPTO; U.S. Appl. No. 16/991,885; Final Rejection mailed Mar. 7, 2022; (pp. 1-13).

USPTO; U.S. Appl. No. 16/991,885; Notice of Allowance and Fees Due (PTOL-85) mailed Aug. 24, 2022; (pp. 1-13).

USPTO; U.S. Appl. No. 16/991,885; Notice of Allowance and Fees Due (PTOL-85) mailed Dec. 7, 2022; (pp. 1-13).

USPTO; U.S. Appl. No. 16/991,885; Notice of Allowance and Fees Due (PTOL-85) mailed Dec. 23, 2022; (pp. 1-2).

USPTO; U.S. Appl. No. 16/991,885; Office Action mailed Sep. 20, 2021; (pp. 1-13).

USPTO; U.S. Appl. No. 16/991,980; Non-Final Rejection mailed Sep. 14, 2022; (pp. 1-19).

Verma, Nishchal et al.; "Object identification for inventory management using convolutional neural network"; IEEE Applied Imagery Pattern Recognition Workshop (AIPR); Oct. 2016, 6 pages.

* cited by examiner

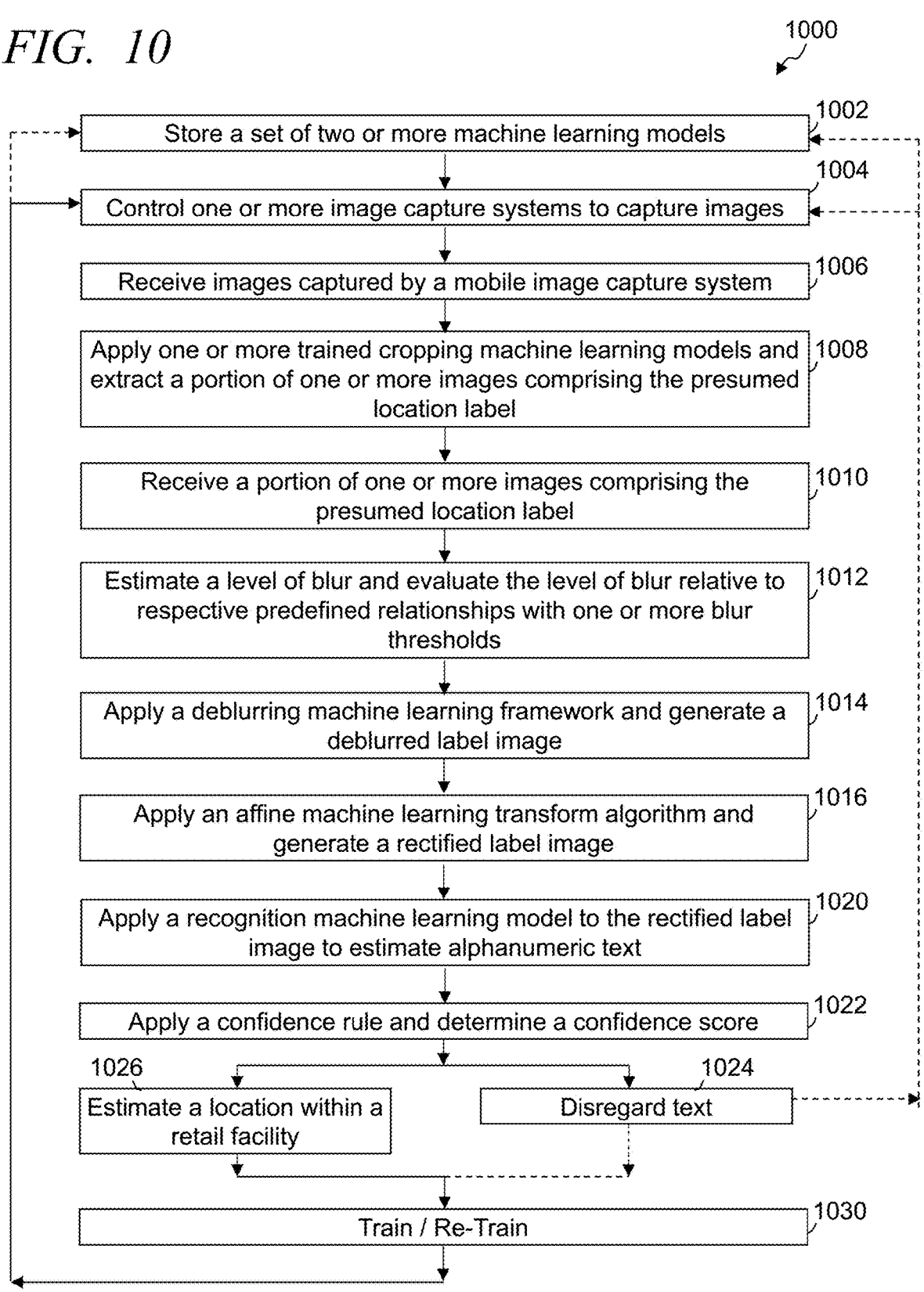

Store a set of two or more machine learning models — 1002

Control one or more image capture systems to capture images — 1004

Receive images captured by a mobile image capture system — 1006

Apply one or more trained cropping machine learning models and extract a portion of one or more images comprising the presumed location label — 1008

Receive a portion of one or more images comprising the presumed location label — 1010

Estimate a level of blur and evaluate the level of blur relative to respective predefined relationships with one or more blur thresholds — 1012

Apply a deblurring machine learning framework and generate a deblurred label image — 1014

Apply an affine machine learning transform algorithm and generate a rectified label image — 1016

Apply a recognition machine learning model to the rectified label image to estimate alphanumeric text — 1020

Apply a confidence rule and determine a confidence score — 1022

1026    1024

Estimate a location within a retail facility

Disregard text

Train / Re-Train — 1030

SYSTEMS AND METHODS OF TRANSFORMING IMAGE DATA TO PRODUCT STORAGE FACILITY LOCATION INFORMATION

TECHNICAL FIELD

This invention relates generally to transformations of image data to location information.

BACKGROUND

Many product storage facilities are relatively large. Inventory is distributed throughout these product storage facilities. A typical product storage facility (e.g., a retail store, a product distribution center, a warehouse, etc.) may have hundreds of shelves and/or other product support systems and thousands of products stored on the shelves, product support systems, and/or on pallets.

It can be beneficial to accurately estimate a location within the product storage facility. For example, it may be beneficial to accurately estimate a location in order to detect item stock status, enable workers to find/restock items faster, and/or identify mismatching between price tag and item. It is common for workers of such product storage facilities to manually (e.g., visually) inspect product display shelves and/or pallet storage areas to evaluate products and the location of products. This manual inspection is time consuming and is less optimal when compared to an automated process.

BRIEF DESCRIPTION OF THE DRAWINGS

Disclosed herein are embodiments of systems, apparatuses and methods pertaining to estimating locations within a product storage facility. This description includes drawings, wherein:

FIG. 10 illustrates a simplified flow diagram of an exemplary process of confirming and/or confirming locations within a product storage facility, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Figure 1:
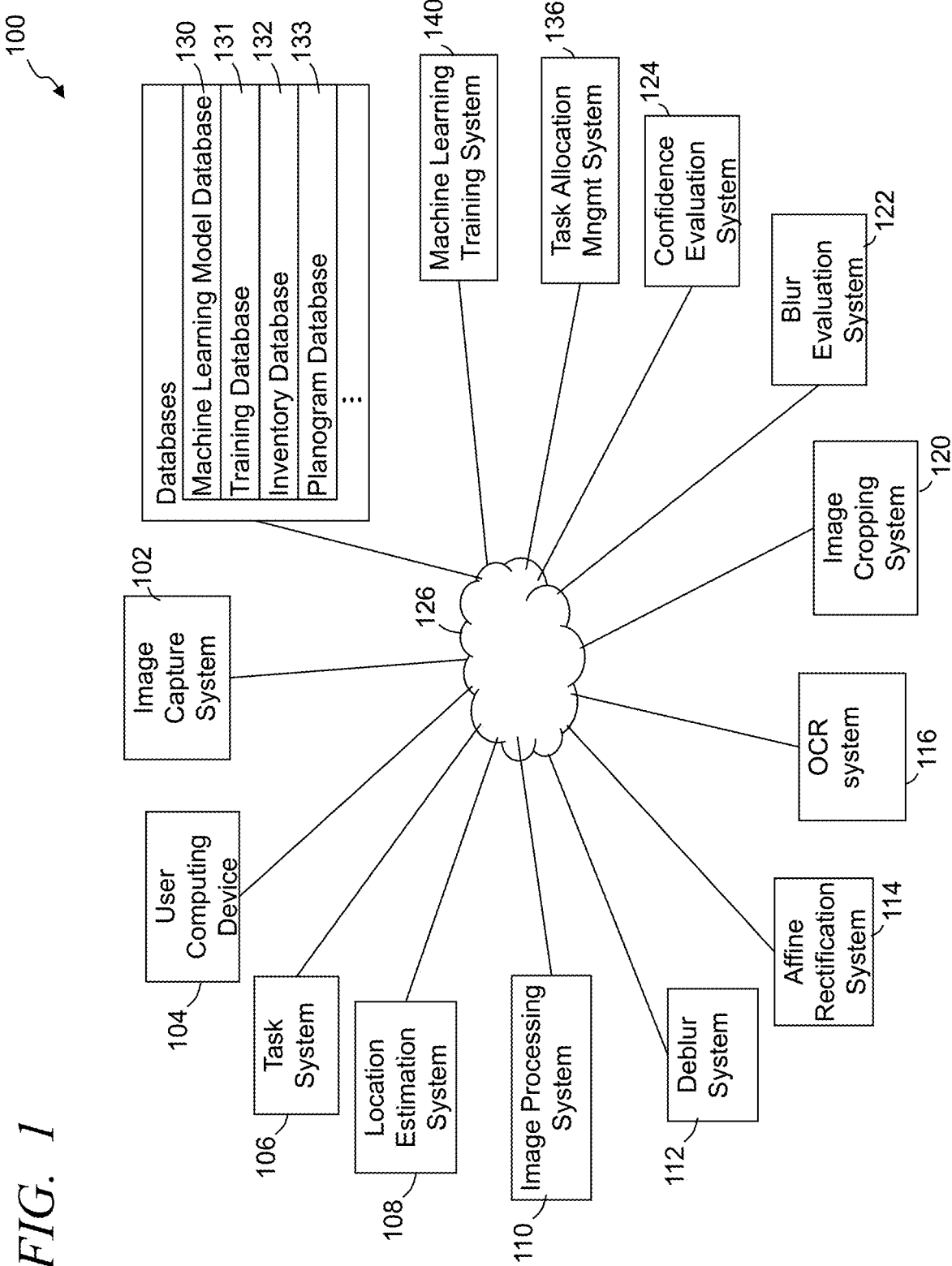
FIG. 1 illustrates a simplified block diagram representation of an exemplary image based product storage facility location confirmation system, in accordance with some embodiments.

Some embodiments provide systems and methods that utilize images to identify location information within a product storage facility that can be used in inventory management, task allocation and control, facility compliance, customer routing, worker or associate routing, task system and/or vehicle routing, numerous other functions and services, and typically a combination of two or more of such functions and/or services. FIG. 1 illustrates a simplified block diagram representation of an exemplary image based product storage facility location confirmation system 100, in accordance with some embodiments. The product storage facility can be substantially any relevant product storage facility, such as but not limited to a retail store, a product distribution center, a fulfillment center, a warehouse, a manufacture storage facility, a shipping facility, and/or other such product storage facilities. The location confirmation system 100 includes multiple different image capture devices 102 or systems to capture images, and is configured to transform information within the image at least in part into location information. Typically, at least some of these image capture devices 102 are mobile image capture devices and/or part of a portable system and configured to move and/or be moved about the product storage facility and/or product storage of the product storage facility and capture images from one or more various angles. For example, image capture devices 102 can be part of a mobile user computing device 104 that is configured to be transported by a user (e.g., customer, retail worker, third party vendor, etc.), part of a mobile task system 106. The task systems 106 can be manned and/or unmanned. It is understood the direction and type of movement of the image capture device 102 about one or more areas of the product storage facility 105 may depend on the physical arrangement of the areas, objects within those areas, sizes and/or shapes of product storage structure (e.g., shelving systems, racks, bins, tables, refrigerator system, etc.). For example, the image capture device 102 may move linearly down an aisle alongside a product storage structure (e.g., a shelving unit), may move in a circular fashion around a table having curved or multiple sides, other such relevant movements, or a combination of such movements. The product storage structure provides a structure on which products are stored, positioned and/or supported, and may include a pallet, a shelf cabinet, a single shelf, table, rack, displays, bins, gondola, case, countertop, another product displays, other such support structures, or a combination of two or more of such support structures.

The captured images or one or more parts of the images, in some embodiments, are processed to improve image quality, and the improved images and/or parts of the images are utilized to by a location estimation system 108 to transform the images and/or portions of the images to estimated or predicted locations within the product storage facility of a label or other object captured within the image and/or estimated or predicted location of the image capture device 102 when the respective image was captured. In some embodiments, the location confirmation system 100 includes one or more deblur systems 112, one or more rectification systems 114, one or more optical character recognition (OCR) systems 116, one or more image cropping systems 120, one or more blur evaluation systems 122, one or more confidence evaluation systems 124, and typically a combination of two or more of such systems, which can be communicatively coupled over one or more distributed communication and/or computer networks 126. Each of the deblur systems 112, rectification systems 114, OCR systems 116, image cropping systems 120, blur evaluation systems 122, and confidence evaluation systems 124 typically includes one or more respective systems implemented through one or more processors, microprocessors, servers, and/or other such systems executing code stored in one or more local and/or remote memory.

The location confirmation system 100 further typically includes and/or is communicatively coupled over one or more communication and/or computer networks 126 with one or more databases storing relevant information, rules, models, algorithms, frameworks, data, other such information or a combination of two or more of such information that can be used by and/or generated by the location confirmation system 100. Some embodiments, for example, include one or more machine learning model databases 130 storing one or more sets of machine learning models, algorithms, frameworks and the like to be implemented by one or more systems of the location confirmation system

100. Some embodiments further include one or more machine learning training databases 131 storing training data, sample data, training corpora, and/or other such training content that is used to train one or more of the machine learning models, algorithms and/or frameworks. The location confirmation system 100 typically further includes and/or is in communication over one or more communication networks with one or more machine learning training systems 140 configured to access the machine learning databases and utilize the machine learning content to train and repeatedly over time update the training of the multiple machine learning models, algorithms, frameworks, and the like.

In some embodiments, the location confirmation system 100 includes and/or is in communication with one or more inventory databases 132 maintaining current, historic and/or predicted inventory information of products offered for sale through the product storage facility. One or more product storage facility planogram databases 133 may be included that maintains information about historic, current and/or planned product storage facility layouts, placement, facility coordinates, movement and/or other information regarding positioning, movement, additions, removal and/or the like of products, shelving systems, racks, advertising, point-of-sale systems, other such physical objects and typically a combination of two or more within the product storage facility.

Some embodiments include one or more task allocation management systems 136 configured to manage the assignment and/or track progress of tasks performed at the product storage facility. Such tasks can be assigned to facility workers and/or task systems 106. Task systems 106 can include manned and/or unmanned task systems. For example, the task systems can be autonomous robot systems configured to perform instructed tasks (e.g., cleaning, inventory evaluation, product picking, product stocking, customer support, product transport, other such tasks, or a combination of two or more of such tasks). Similarly, the task system can be utilized and/or controlled by a user (e.g., forklift, pallet dolly, dolly, cart, etc.), and/or other such mobile systems. Some embodiments additionally include one or more stationary image capture devices 102 positioned at a different locations and distributed throughout one or more portions of the product storage facility. Unmanned task systems 106 can comprise the image capture device 102, a task system control circuit, and a movement system communicatively coupled with the task system control circuit. The task system control circuit is configured to implement code to control the movement system to control the movement of the unmanned task system through the product storage facility. The image capture device 102 is configured to capture the images as the task system moves through one or more portions of the product storage facility. Similarly, portable user computing devices 104 can be utilized. These user computing devices can include one or more image capture devices 102. The user computing device can be configured to be transported by a user (e.g., facility associate, customer, manager, etc.) associated with the user computing device as the user moves through the product storage facility. For example, the user computing device can be a smartphone, tablet, laptop, product storage facility scanning system (e.g., bar code scanner, RFID scanner, etc.), and other such portable user computing devices. The image capture device can be configured to capture the images as the user computing device is transported through one or more portions of the product storage facility and/or while stationary.

The image capture device 102 (also referred to as an image capture system or unit) of the exemplary system 100 can, in some embodiments, be configured for movement around the product storage facility (e.g., on the floor via a motorized or non-motorized wheel-based and/or track-based locomotion system, via slidable tracks above the floor, etc.) such that, when moving (e.g., about an aisle or other area of a product storage facility), the image capture device 102 has a field of view that includes at least a portion of one or more of product storage structures (e.g., shelving systems, racks, refrigeration systems, etc.) within a given product storage area of the product storage facility, permitting the image capture device 102 to capture multiple images of the product storage area from various viewing angles. In some embodiments, the image capture device 102 is configured as and/or incorporated into a robotic device that moves without being physically operated/manipulated by a human operator. In other embodiments, the image capture device 102 is configured to be driven or manually pushed and/or is part of a system that is configured to be driven and/or manually pushed (e.g., like a cart or the like) by a human operator. In still further embodiments, the image capture device 102 may be or be part of a hand-held or a wearable device (e.g., a camera, phone, tablet, or the like) that may be carried and/or moved about by a worker at the product storage facility while the worker moves about the product storage facility. In some embodiments, the image capture device 102 may be incorporated into another mobile device (e.g., a floor cleaner, floor sweeper, forklift, etc.), the primary purpose of which is independent of capturing images of product storage areas of the product storage facility.

The location confirmation system 100, in some implementations, includes a product shipping control system configured to submit orders for products, track product orders, track shipments of products, predict product deliveries, and/or other such operations. Shipping information can be provided, in some embodiments, to the task allocation system for use in scheduling and/or assigning tasks associated with products.

As introduced above, one or more image capture devices 102 can be moved and/or be moved about the product storage facility and configured to capture images within a product storage facility. Many, if not all, of the images capture one or more location labels that are positioned at known locations throughout one or more parts of the product storage facility. These location labels are known labels that correspond to the known locations and/or coordinates within the product storage facility. The location labels can include predefined location tags and/or markers, product pricing labels, other such labels, markers, structures, and the like that are positioned at known locations (or within a threshold variation of a known location). Further, the location labels are typically labels with alphanumeric characters, positioned at predefined, known location. These location labels are typically not product labels or part of products, and are labels positioned at predefined locations in accordance with a predefined layout and/or product storage facility coordinates.

Figure 2:
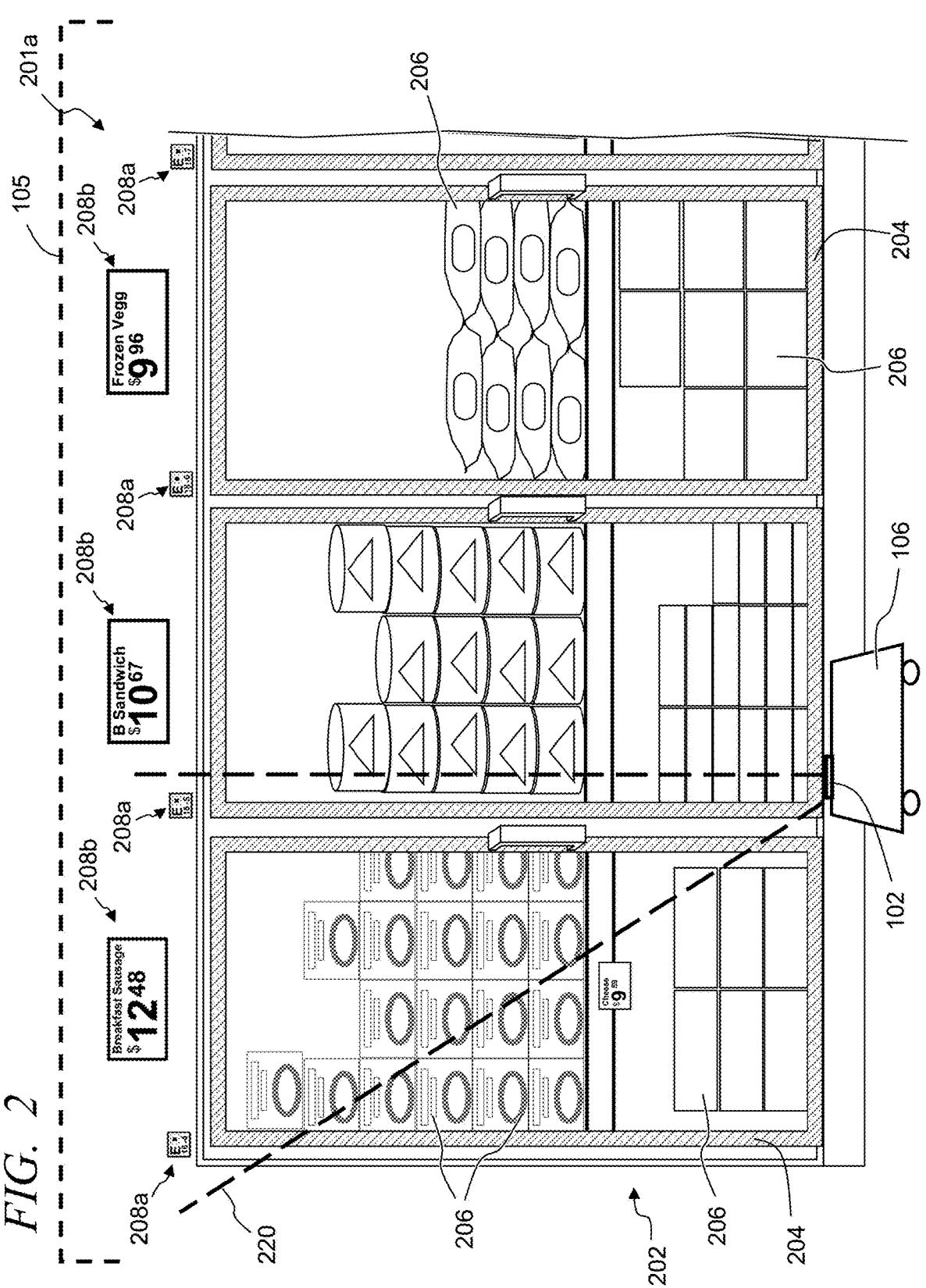
FIG. 2 illustrates a partial view of one side of an exemplary aisle of a product storage facility showing a partial view of a refrigerator system, in accordance with some embodiments.

FIG. 2 illustrates a partial view of one side of an exemplary aisle 201a of a product storage facility 105 showing a partial view of a refrigerator system 202, in accordance with some embodiments. The aisle, in this example, includes the refrigerator system 202 with multiple access doors 204, and products 206 positioned within the refrigerator system. One or more location labels 208 are placed at predefined known locations corresponding to known two-dimensional coordinates (x-y coordinates) and/or three-dimensional coordinates (x-y-z) of the product storage facility and/or a mapping of the product storage facility. The location labels 208 can include, for example, one or more predefined location tags 208a having a predefined format and positioned at known locations along the length of the refrigerator system 202. In some implementations, location labels 208 can include one or more pricing tags 208b corresponding to different products, which can be further positioned at approximate known locations corresponding to the placement of the corresponding product within the refrigerator system 202. For example, the product pricing tags 208b can be secured relative to a door 204 through which the corresponding product can be accessed, and as such the pricing tags 208b are typically positioned within a threshold distance of a central axis of the respective door being positioned at a known location within the product storage facility. Some embodiments prioritize types of location labels. For example, a first type of location labels may be expected to have a higher degree of precision in the particular placement of that type of location label than a second type of location label, while the second type location label may have a higher expected degree of precision placement over one or more other types of location labels. Accordingly, location information determined based on the first type of location label may be assigned a higher priority and/or assumed to be more accurate than location information determined based on the second type of location label and/or the other types of location labels. Similarly, location information determined based on the second type of location label may in some implementations and/or instances may be assigned a higher priority and/or assumed to be more accurate than location information determined based on one or more other types of location labels.

Figure 3:
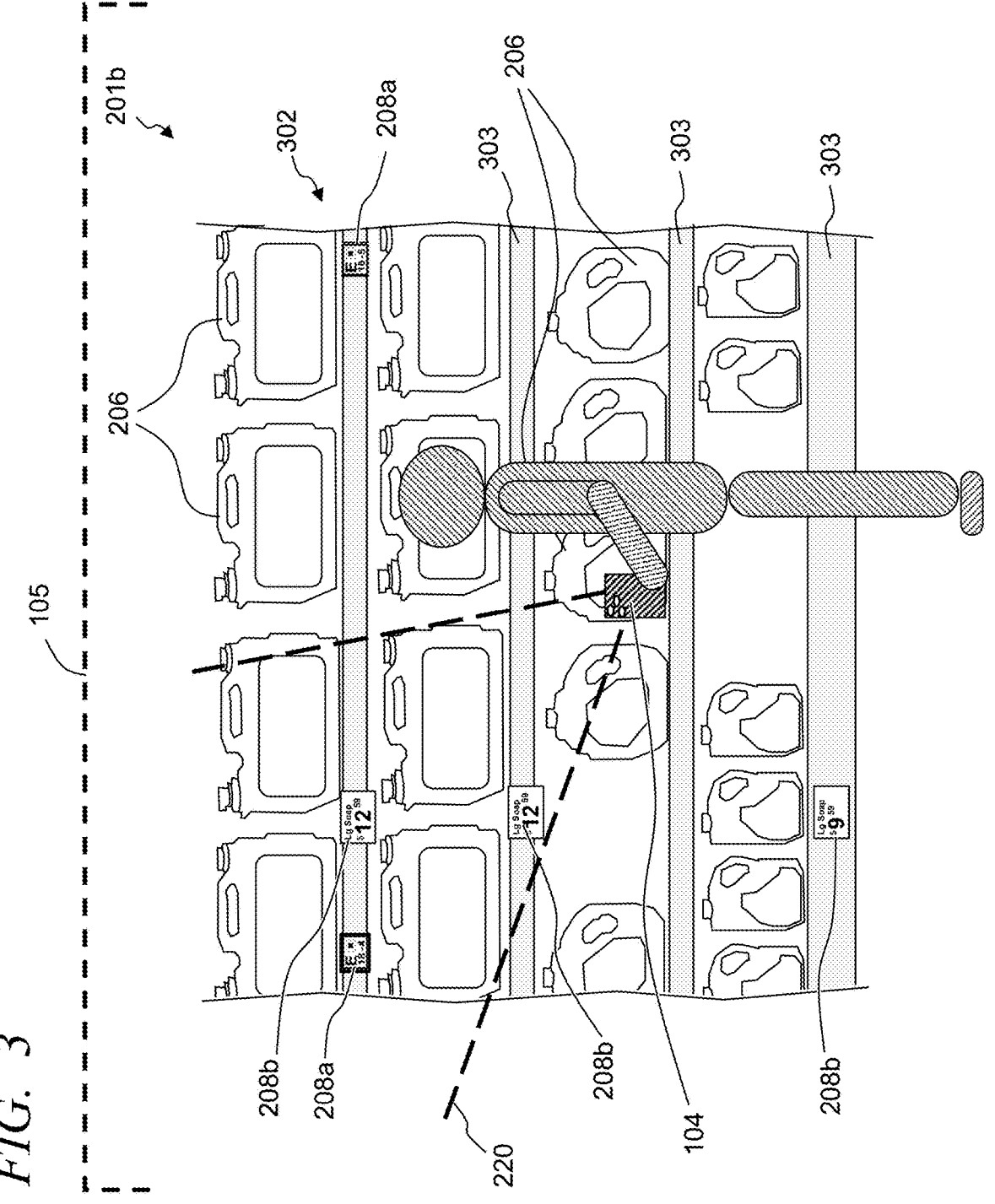
FIG. 3 illustrates a partial view of one side of an exemplary aisle of a product storage facility having a product shelving system, in accordance with some embodiments.

FIG. 3 illustrates a partial view of one side of an exemplary aisle 201b of a product storage facility 105 having a product shelving system 302, in accordance with some embodiments. The shelving system 302 includes multiple shelves 303 upon which products 206 are positioned and supported. One or more location labels 208 are placed at predefined known locations corresponding to known two-dimensional coordinates (x-y coordinates) and/or three-dimensional coordinates (x-y-z) of the product storage facility and/or a mapping of the product storage facility. The location labels 208 can include, for example, one or more predefined location tags 208a positioned at known locations along the length of the shelving system 302. In some implementations, the aisle can include one or more pricing tags 208b corresponding to different products 206, but further positioned at approximate known locations corresponding to the placement of the corresponding product within the shelving system (e.g., a known vertical and horizontal section).

Again, the location confirmation system 100 receives images captured by one or more image capture devices 102. Referring to FIG. 2, in some embodiments, the image capture device 102 is part of a task system 106 that is controlled to travel through one or more portions of the product storage facility or all of the product storage facility. As the task system 106 moves through the product storage facility the image capture device 102 is configured to capture an image, and typically capture multiple images. Similarly, FIG. 3 illustrates an individual (e.g., facility worker, customer, etc.) moving through the product storage facility while transporting a user computer device 104 that includes one or more image capture devices that is configured to capture one or more images as the user computing device 104 is moved through the product storage facility.

The images captured by one or more image capture devices 102 are utilized to determine an estimated location within the product storage facility of one or more location labels 208 captured within the respective images and/or determine an estimated location within the product storage facility of the respective image capture device 102 at the time of the respective image is captured. The location confirmation system 100, in some embodiments, attempts to identify one or more location labels within an image and use a known location of the location labels to estimate the location. It is noted, however, that the location labels are typically at a relatively significant distance (e.g., greater than two feet, often greater than four feet, and in some instances greater than 10 feet or more) from the image capture device 102 when images are captured. As such, the location labels 208 are relatively small compared to a field of view 220 of the capture image, and often occupies less than 15%, and in some instances less than 2% of the area of the image.

Figure 4:
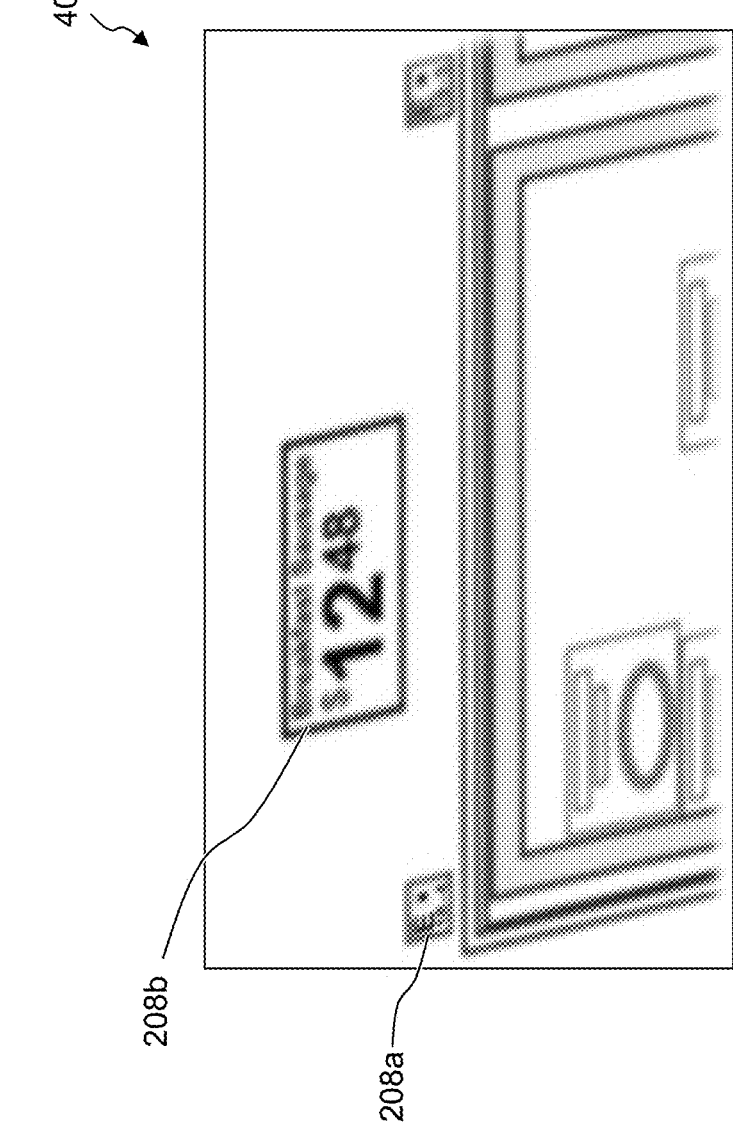
FIG. 4 illustrates a simplified representation of at least a portion of an exemplary photograph image captured by an image capture device, in accordance with some embodiments.

FIG. 4 illustrates a simplified representation of at least a portion of an exemplary photograph image 400 captured by an image capture device 102, in accordance with some embodiments. As described above, movement, angle, focus, and/or other aspects can result in images with blur, distortion, warping and/or other effects on one or more location labels 208 within the captured image 400. Further, because of the distance, orientation and/or other factors between the image capture device 102 and the location labels (e.g., typically greater than 2 feet, often greater than 5 feet), the location label (e.g., location tag, price label, etc.) only occupy a relatively small percentage of the area of the image (e.g., often less than 20%, and typically less than 10%). Typically, the images 400 are captured without require specific orientation of the image capture device as is often required with other systems, such as barcode readers and/or imaging systems capturing bar codes. Instead, the images are captured by the image capture devices 102 as those image capture devices, and typically systems in which the image capture devices are incorporated, move through the product storage facility. These task systems, user computing devices and/or other such systems are primarily intended for other purposes, and the location confirmation system 100 takes advantage of image capturing systems of these systems as a secondary aspect.

In some embodiments, the location confirmation system 100 includes one or more image cropping systems 120. The image cropping systems 120 can be communicatively coupled over the distributed communication network 126 with the machine learning model database 130 that stores one or more machine learning models and/or algorithms. The image cropping system 120 utilizes a trained cropping machine learning model that when executed by one or more processors of an image cropping control circuit to identify within and extract from the captured image 400 to provide a cropped image of a portion of captured image 400 comprising the presumed location label 208. It is noted, that in some rare instances the cropping may inadvertently identify an item within the image as a location label that is not a location label. Such invalid items, in some embodiments, are detected and discarded as described below. The cropping machine learning model, in some embodiments, is an object detection neural network trained to detect location labels 208. For example, in some implementations the cropping neural network predicts coordinates of a predefined shape (e.g., square, rectangles, triangles, octagon, etc.) within the image that fit a location label in the image, and coordinates are used to crop out the location label 208 from the image to provide the cropped image specific to a predicted location label 208.

Further, as described above, the image capture device 102 typically is not focused on the location labels, which can result in blurring and/or distortion of the location labels captured in an image. Additionally or alternatively, the movement of the image capture device 102 can further adversely induce blur, distortion, warping and/or other adverse effects on the captured location label within the image. Still further, the varying orientations of the image capture devices 102 relative to the location labels 208 can also results in images that appear to distort the location labels within the image.

Figures 5, 6:
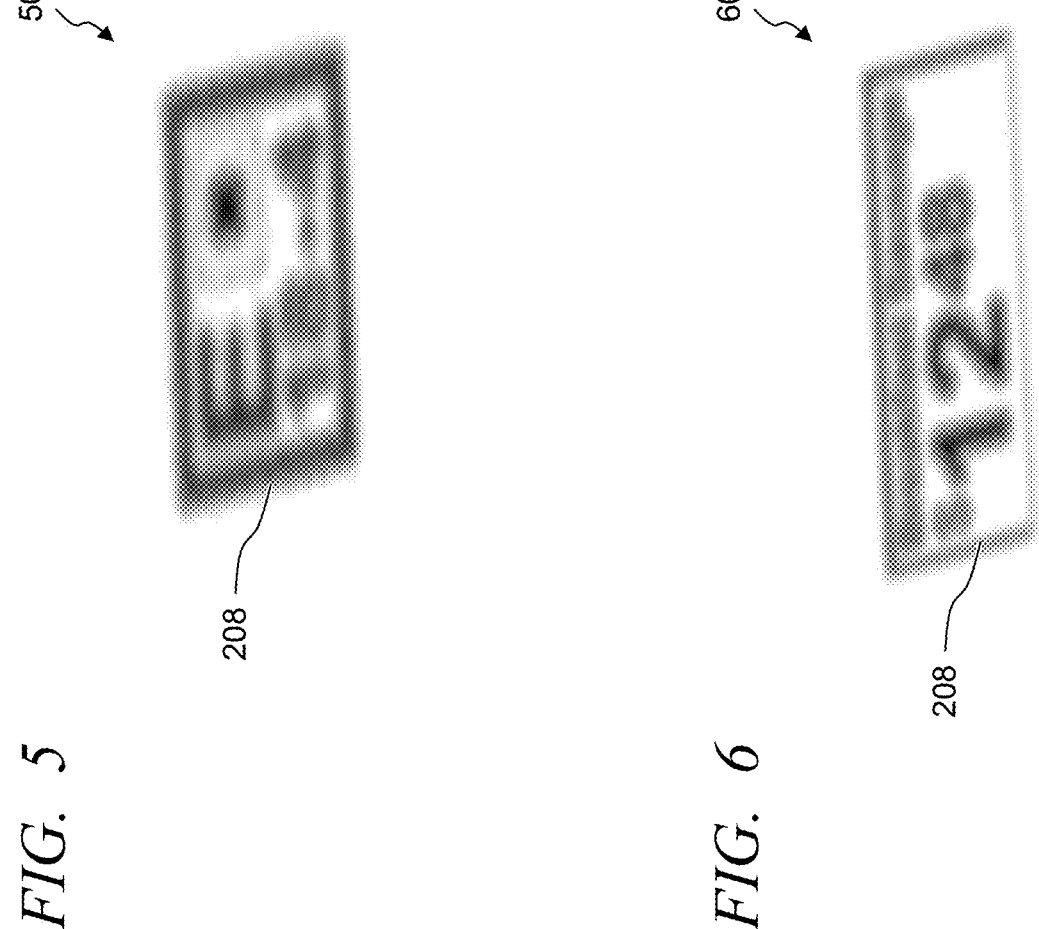
FIG. 5 illustrates a simplified representation of an exemplary cropped photograph image of a portion of the capture image that includes a presumed location label, in accordance with some embodiments.
FIG. 6 illustrates a simplified representation of an exemplary cropped photograph image of a different portion of the capture image that includes a presumed location label, in accordance with some embodiments.

FIG. 5 illustrates a simplified representation of an exemplary cropped photograph image 500 of a portion of the capture image 400 that includes a presumed location label 208, in accordance with some embodiments. FIG. 6 illustrates a simplified representation of an exemplary cropped photograph image 600 of a different portion of the capture image 400 that includes a presumed location label 208, in accordance with some embodiments. The cropped images 500, 600 further illustrate that blurring, distortion and/or other factors can adversely affect the clarity of the presumed location label 208.

Some embodiments apply one or more filtering rules and/or evaluation rules of the captured image 400 and/or the cropped images 500, 600. For example, some embodiments include a preliminary blur evaluation system 122 that is configured to apply one or more blur evaluation rules to evaluate the captured images and/or the cropped images to estimate a level of blur of the image or the cropped portion of the image and/or a level of distortion. In some implementations a level of blur and/or distortion is identified and evaluated relative to one or more respective preliminary thresholds in determining whether the cropped portion of the image and/or the image is too blurry and/or too distorted to be useful in accurately predicting text on one or more presumed location labels 208. The level of blur can be determined through one or more methods, such as but not limited to Laplacian Filtering, edge detection, motion blur detection, Gaussian blur detection, other such methods, or a combination of two or more of such methods. Similarly, the level of distortion can be predicted based on edge detection, corner detection, mean-square error, spatial pattern detection, other methods or a combination of two or more of distortion measure techniques. The thresholds can be dependent on one or more factors and/or learned over time based on repeated application of machine learning models in attempting to identify text from different levels of blurred images and feedback based on an accuracy of the predicted text.

Further, the filtering rules in some implementations may prevent further processing of the captured image 400 and/or cropped image 500, 600 when the estimated level of blur and/or distortion does not have a predefined relationship with one or more preliminary blur thresholds and/or preliminary distortion thresholds. In some instances, for example, an image and/or cropped image of portions of an image may be discarded when a corresponding estimated level of blur of that image or cropped image does not have the predefined relationship with the respective preliminary threshold. As such, an image or cropped image can be discarded image when a corresponding estimated level of blur and/or distortion of that image or cropped image does not have the predefined relationship with the respective one or more preliminary thresholds. Alternatively, the filtering rules in some embodiments enable and/or authorize further processing, as further described below, of the captured image 400 and/or one or more cropped image when the estimated level of blur and/or distortion have a predefined relationship with one or more blur and/or distortion thresholds. Additionally or alternatively, in some embodiments deblurring and/or de-warping of the image and/or the cropped images can be skipped when the level of blur and/or distortion is determined to be below one or more thresholds.

In some embodiments, images 400 and/or one or more cropped images 500, 600 are processed to deblur the image and/or cropped image. As introduced above, in many instances the location labels 208 captured within images that are captured by the image capture devices 102 are often blurry. Again, because of the distances between the image capture devices 102 and the location labels, the size of the location labels relative to the field of view 220 of the image capture devices 102, the movement of the image capture devices and/or other similar factors, the portions of images including the location labels are often blurry.

Some embodiments include one or more deblur systems 112. The one or more deblur systems 112 are typically communicatively coupled over one or more distributed communication networks 126 with the machine learning model database 130 to access one or more deblurring machine learning models, algorithms and/or frameworks. In some embodiments, the deblur system 112 is configured to receive a portion of the image 400, such as one or more cropped images 500, 600 that include a presumed location label 208 captured by the image capture device 102. The deblur system 112 can apply one or more deblurring machine learning frameworks, algorithms and/or models to the portion of the image 400 (e.g., a cropped image 500) and generate a deblurred label image that comprises the presumed location label 208. The application of the deblurring machine learning framework, in some embodiments, is an iterative process where the deblurring machine learning framework can be applied multiple times to subsequently generated deblurred sub-images to achieve a desired and/or threshold level of deblurring.

Figure 7:
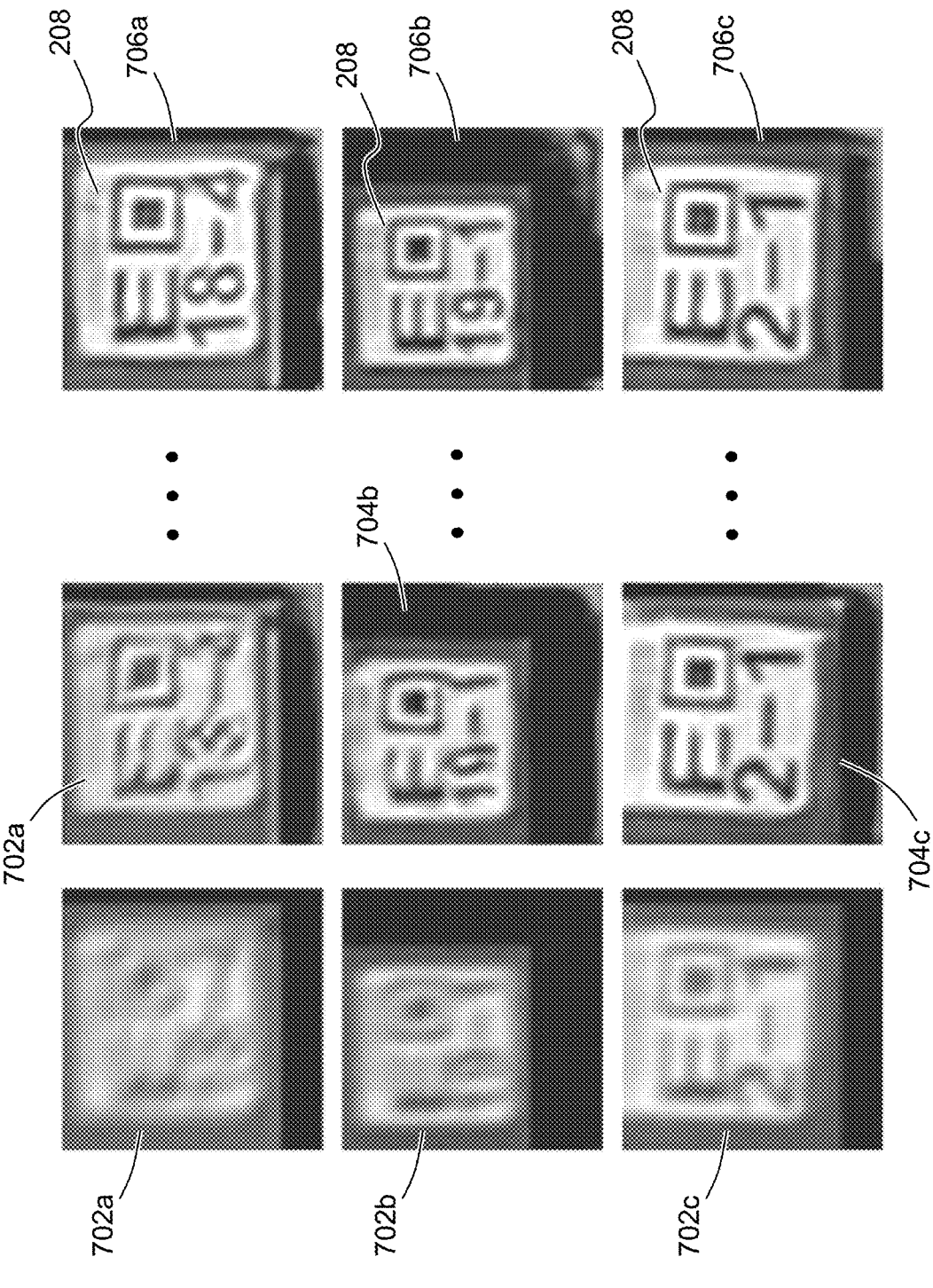
FIG. 7 illustrates a simplified representation of an exemplary set of multiple initial blurred, cropped photograph images that are cropped from one or more captured images, and prior to the application of one or more deblurring machine learning frameworks, in accordance with some embodiments.

FIG. 7 illustrates a simplified representation of an exemplary set of multiple initial blurred, cropped photograph images 702a-702c that are cropped from one or more captured images, and prior to the application of one or more deblurring machine learning frameworks, in accordance with some embodiments. The deblur system 112 applies the deblurring machine learning framework to the initial blurred, cropped images 702a-702c to generate first intermediate deblurred, cropped images 704a-704c. In some embodiments, the deblur system 112 can continue to apply one or more of the deblurring machine learning frameworks to subsequently generated intermediate deblurred, cropped images 704a-704c to generate respective deblurred label images 706a-706c that each comprises a presumed location label 208. The deblur system 112 can, in some implementations, continue to apply one or more of the deblurring machine learning frameworks to one or more of the generated intermediate deblurred, cropped images 704a-704c to generate further intermediate deblurred cropped images and/or a resulting respective deblurred label images 706a-706c that each comprises a presumed location label 208.

The one or more deblurring machine learning frameworks can be implemented, in some implementations, through one or more deep learning networks and/or neural networks. For example, some embodiments apply one or more generative adversarial networks (GAN) that are trained, at least in part through the machine learning training system 140, to de-blur presumed location label images 702a-702c, and to generate deblurred label images that include presumed location labels that are less blurry. The one or more deblurring machine learning frameworks are trained in part based on known images with a good quality (e.g., with a blur factor less than a blur training threshold). Some or all of these good quality training images can further be intentionally modified to increase the blur and/or other degradation. For example, the good quality training images can be modified by add motion blur and/or gaussian blur. As such, some embodiments create at least blur training pairs or sets (more than two) of training images with each set of pair comprising a good quality image and one or more blurred versions of that good quality image (e.g., multiple different blurred versions can be created with differing amounts and/or types of blur). The one or more deblurring machine learning frameworks can be trained using the multiple blur training sets or pairs of images learning to transition from blurred image to sharp, good quality images. Feedback is typically provided based on a comparison of the generated good quality images relative to the known good quality images. Still further, images captured by the image capture devices 102 can further be provided as training data and/or feedback in further training and/or continuing to train the deblurring machine learning frameworks. Still further, in some implementations, the deblurred portions of the captured images (e.g., predicted location tag images 702a-702c), which in some instances can be intentionally blurred as described above to create some of the blur training pairs or sets of training images.

In some embodiments, one or more blur training databases are included in the location confirmation system 100. The blur training database(s), in some implementations, is configured to store numerous training sets of actual images and numerous training sets of artificial images. The training sets of actual images each comprise an actual image of one of the known location labels and at least one artificially blurred version of the one of the known location labels. The training sets of the artificial images, in some embodiments, each comprises an artificially generated image of a representative location label based on one or more known formats, fonts, sizes, colors, spacing and/or other such know aspects of alphanumeric characters and/or symbols included on the known actual location labels 208 within the product storage facility, and at least one artificially blurred version of the artificially generated image. In some embodiments, one or more generative adversarial networks (GAN) are utilized to blur, distort and/or otherwise "fuzz" artificially generated examples to increase the breadth of the training set and increase overall accuracy. A renderer can be used to generate thousands or millions of images based on the location tag rules. Before training the model, a random blur, noise, perspective and/or other factors can be applied to the generated images to degrade the images. One or more machine learning training systems 140 can be communicatively coupled over the distributed communication network 126 with the one or more blur training databases, of the one or more machine learning training databases 131, wherein the machine learning training system is configured to repeatedly train over time the deblurring machine learning framework utilizing the numerous training sets of actual images and the numerous training sets of artificial images.

Some embodiments further include one or more rectification systems 114 that are typically communicatively coupled over the one or more distributed communication networks 126 with the machine learning model database 130. The rectification system 114 is configured to apply a rectification machine learning transform algorithm to the deblurred label images and to generate respective rectified label images. Again, the location labels 208 are often at angles relative to the image capture devices 102 (often angles of at least two axis, and in many instances angles relative to x, y and z axis), and further the images are often captured as the image capture device 102 is in motion. As such, in some instances, some of the images and/or portions of the capture images are distorted, warped and/or otherwise appear deformed. Again, FIGS. 5 and 6 illustrate examples of portions of a captured image and these portions appear warped or deformed. Such deformation can adversely affect the accurate detection of text and/or symbols presented on the location labels 208. Accordingly, some embodiments include and implement the rectification system 114 that is configured to apply a rectification machine learning transform algorithm to an image and/or a portion of an image. For example, the rectification machine learning transform algorithm can be applied relative to deblurred label image to generate a rectified label image. The rectification can be substantially any correction of distortion, warping and/or other such errors and/or inconsistencies (e.g., affine transformation, rotation, de-rotation, stretching, un-stretching, warping, de-warping, other such inconsistency corrections, or a combination of two or more of such inconsistency corrections).

Figures 8, 9:
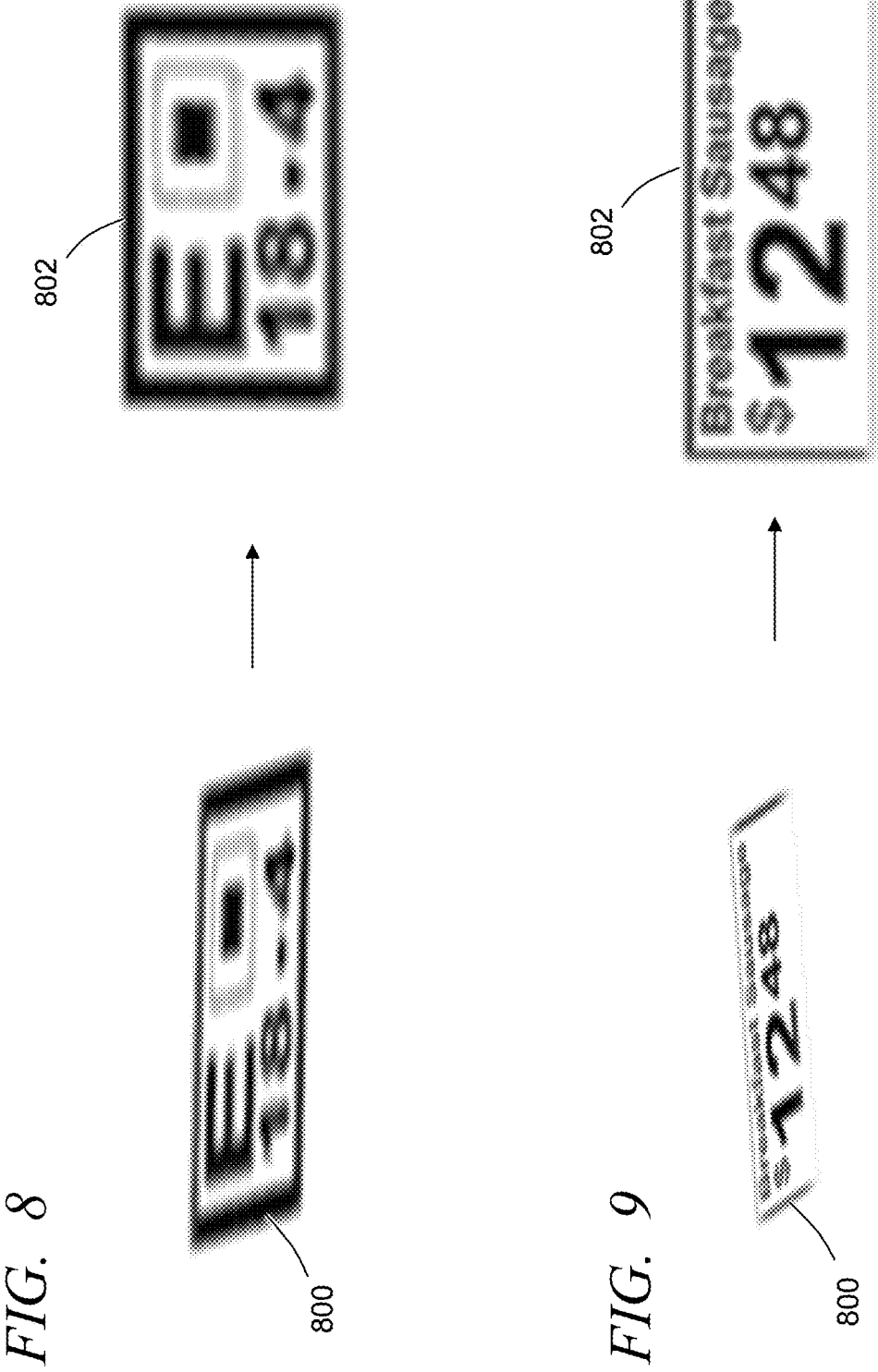
FIG. 8 illustrates an exemplary representation of a distorted label image cropped from an image captured by an image capture device, in accordance with some embodiments.
FIG. 9 illustrates an exemplary representation of a distorted label image cropped from an image captured by an image capture device, in accordance with some embodiments.

FIGS. 8-9 illustrate exemplary representations of distorted label images 800 cropped from an image captured by an image capture device 102, in accordance with some embodiments. The rectification system 114 can applied the one or more rectification machine learning transform algorithms to the distorted label images 800 to compensate and/or correct for at least some of the distortion in attempts to clarify the portion of the image and/or alphanumeric text within the distorted image. The application of the rectification machine learning transform algorithm can product respective rectified label images 802. In some embodiments, for example, the rectification system 114 can apply the one or more rectification machine learning transform algorithms after and/or prior to the deblurring. The de-warping can be applied to rectify the de-blurred portion of an image in attempts to make alphanumeric text and/or other known symbols appear to be seen straight on and/or otherwise increase a likelihood of correct classification of the text and/or symbols. Typically, the location labels 208 have a predefined and known shape (e.g., rectangle, square, triangle, etc.). Using the known shape and/or configuration, the rectification machine learning transform algorithm more accurately identifies and justifies the image to be consistent with the known shape. Some embodiments detect corners and use orientation of corners relative to the known shape, at least in part, to adjust and/or modify the image in rectifying the image and/or text. In some embodiments, the machine learning transform algorithms apply open computer vision (CV) techniques using perspective transforms.

Some embodiments further apply one or more pattern confirmation rules relative to known patterns and/or arrangement of the known location labels 208. For example, a known location tag 208a may have a known, predefined format and/or pattern. The de-blurred and/or rectified image of the location label can be evaluated to confirm that the location label conforms to a respective one of one or more predefined formats and/or patterns. For example, a known pattern of a location tab 208a can include two rows, with a top row having an alphabetic letter followed by a known symbol, and a lower row having one or more numbers, followed by a dash, followed by one or more numbers.

Referring back to FIG. 7, there is illustrates three representations of exemplary location tags having a top row with a letter (e.g., "E"), followed by a known symbol (e.g., square outlining a solid square), and a lower row with a number (e.g., "18" representing for example an aisle), followed by a dash, followed by another number (e.g., "4" representing a section or bin within the identified aisle 18). Pricing tags 208b also can be configured with a known pattern or arrangement, which is typically different than the known pattern of the location tags. Additionally or alternatively, other pattern factors can be used in attempting to confirm and/or part of confirming a location label, such as but not limited to known colors, known color schemes, known fonts, other such factors, or a combination of two or more of such factors.

Based on these known "patterns" the presumed location labels 208 can be evaluated, and in some instances after the deblurring and/or rectification when implemented, to confirm that the object predicted to be a location label within the image and/or cropped image complies with and/or is within a threshold variation of a known pattern and/or format. Typically, the pattern evaluation is performed following the de-blurring and/or rectification such that the object within the image is presumed to be more accurately identifiable. Should it be determined that the object within the image does not comply and/or is not within the threshold variation, the presumed location label within the deblurred and/or rectified image can be assumed not to be a location label, and not further evaluated. Alternatively, when the object within the image and/or cropped image complies with and/or is within the threshold variation, image and/or cropped image is further processed. One or more methods may be used to identify the patterns. For example, some embodiments apply a pixel evaluation in attempts to identify a pattern, apply a contour evaluation in attempts to identify a pattern, apply a machine learning algorithm (e.g., yolo machine learning object detection algorithms) in attempts to identify the pattern, other such methods or a combination of two or more pattern detection methods.

Some embodiments, evaluate images and/or cropped images and identify a level or degree of confidence that the object presumed to be a location label captured within the image and/or cropped image is actually a location label 208. Again, the relative area of a location label within the overall area of a captured image 400 is relatively small (e.g., typically less than 15% and in most instances less than 5% of the image of the area). The accurate identification of a location label within an image can be difficult, and objects that are not location labels may inadvertently be presumed to be a location label. Accordingly, some embodiments evaluate the presumed location labels in attempts to limit further processing of objects that are not actually location labels based at least in part on the determined level of confidence.

Some embodiments consider other factors in predicting a level of confidence that an object within a cropped image 500, 600 is actually a location label 208. For example, some embodiments consider sensor data, such as but not limited to accelerometer data, velocity data, RFID tag detection data, product recognition information, global positioning data, wireless signal triangulation data, other such sensor data or a combination of two or more of such sensor data obtained as the image capture device 102 and/or the system in which the image capture device is incorporated (e.g., task system, user computing device, etc.) moves through the product storage facility. Such sensor data can be used in in relation to a planogram and/or product storage facility coordinates to estimate a location of the image capture device in cooperation with a predicted orientation of the field of view of the image capture device in predicting whether the object within the captured image and/or cropped image is predicted to be a location label 208.

The location confirmation system 100, in some embodiments, utilizes one or more optical character recognition (OCR) systems 116 communicatively coupled over the one or more distributed communication networks 126 with the machine learning model database 130. One or more of the OCR systems 116 are configured to apply one or more trained, recognition machine learning OCR models to the deblurred and/or rectified label image 802 to estimate alphanumeric text and/or known symbols of the presumed location label 208. As described above, some embodiments perform one or more OCR techniques after confirming a threshold confidence level of predicted accuracy. Some embodiments additionally or alternatively utilize other known OCR techniques. Still further, the one or more machine learning OCR algorithms are trained and/or updated over time with actual or real image and/or text data, and artificially generated training text data. The real image and/or text data can be actual images of known location labels 208. The generated training text data can be created based on the known textual information included in the known location labels. Again, the location labels use known fonts, color schemes, patterns, shapes and/or other such factors. Accordingly, artificial location labels can be generated and used in training the one or more machine learning OCR algorithms. Some embodiments further induce artificial blur and/or distortion (e.g., through a GAN) to provide additional artificial training data. Still further, the one or more machine learning OCR models are typically repeatedly trained over time using feedback with actual images captured by the image capture devices and knowledge of a likelihood that such actual images provided actual location labels as well as those that were confirmed as not including location labels and/or incorrectly identified location label text.

In some embodiments, the identified text from the presumed location label 208 is provided to the location estimation system 108 in transforming the image or part of the image into location information. The location estimation system 108 is configured to estimate the location of the determined location label 208 and/or the image capture device 102 based on the extracted text determined through the OCR. In some implementations, the location is estimated as a function of the estimated text of the presumed location label relative to and/or based at least in part on known text on known location labels position at respective different known locations within the product storage facility. This determined location and/or location information can be used in numerous aspects of controlling, managing and/or operating the product storage facility. For example, the location information and/or confirmation of a location can be used, but not limited to, controlling a task system, controlling a user computing device 104, controlling a facility worker, confirming a location of a task to be performed by a task system and/or facility worker, providing routing guidance and/or instructions to a task system, facility worker, customer or other entity (e.g., based on an intended destination location different that the determined location), used in associating the location with other information (e.g., inventory information of products at and/or proximate the determined location (e.g., inventory levels, facing conditions, restocking conditions, etc.)), detecting one or more conditions (e.g., spill, trash, restocking in progress, incorrectly placed product, etc.), controlling task systems in the retrieval of one or more products at or proximate the location, controlling user computing devices in identifying products for which a worker or customer is looking, identifying an inaccurate routing, confirming product placement, controlling a mapping of products within the product storage facility, controlling the updating and/or confirmation of planogram information and/or product storage facility coordinates, confirming placement of products and/or location labels 208 in accordance with one or more planograms, controlling inventory systems, other such functions, or a combination of two or more of such functions.

In some embodiments, a confidence evaluation system 124 applying at least the one confidence rule is configured to confirm that the estimated text complies with a predefined alphanumeric pattern of multiple alphanumeric characters. Some embodiments further apply one or more confidence rules and/or processes relative to one or more thresholds to evaluate the identified text in determining a degree or level of confidence that the extracted text is consistent within known location labels 208. The location confirmation system 100, in some implementations, includes one or more confidence evaluation systems 124 that are configured to apply at least one confidence rule and/or process to determine a confidence score of an accuracy of the estimated text of the presumed location label. As described above, the location labels have known patterns, fonts, color schemes and other such known factors, as well as actual known text. Accordingly, a confidence that the text recognized can be determined based on the known patterns, fonts and/or other such factors. Still further, the recognized text can be compared with actual known text from known location labels. Some embodiments further utilize the movement of the image capture devices to utilize a set of two or more sequential images. The frame rate of the image capture device can be controlled and/or set such that two or more sequential images capture overlapping fields of view. As such, two or more sequential images often capture the same location label 208. Some embodiments compare the text extracted from these two or more sequential images as part of one or more confidence evaluation rules. For example, a higher degree of confidence is typically assigned when the text identified from a single presumed location label from two or more sequential images match or are within a threshold variation.

In some embodiments, the confidence evaluation system 124 can apply at least the one confidence rule to confirm that the estimated text complies with a predefined alphanumeric pattern of multiple alphanumeric characters. Similarly, the confidence evaluation system 124, in applying at least the one confidence rule, in some implementations can additionally or alternatively confirm and/or determine that the estimated text complies with a predefined font, color, other known characteristics, or a combination of two or more of such known characteristics. In some embodiments, when the text does not correspond to at least one known text from a known location label the confidence score can be reduced and/or the text can be discarded as not a location label and/or not text not accurately identified. Still further, some embodiments utilize other factors that anticipate a general location (e.g., track movements, RFID tag scanning data, product recognition data, etc.) and estimate a likelihood of that the predicted location label corresponds to one of the location labels proximate the estimated location. In some embodiments, the location estimation system can be enabled to estimate the location of the location label 208 image capture device 102 when the confidence score is greater than a confidence threshold, and prevent the location estimation system from estimating locations when other confidence scores are less than a confidence threshold.

FIG. 10 illustrates a simplified flow diagram of an exemplary process 1000 of confirming and/or confirming locations within a product storage facility, in accordance with some embodiments. In step 1002, a set of two or more machine learning models, algorithms, frameworks and/or other such machine learning architectures are trained and stored in a machine learning model database 130. Some embodiments include step 1004 where one or more image capture devices 102 are controlled to capture images. This can include a central control system communicating instructions to the image capture device(s), one or more task systems 106, one or more user computing devices 104, stationary image capture devices and/or other systems having image capture devices. Additionally or alternatively, a task system and/or user computing device can control their respective one or more image capture devices 102 to capture images. In many instances, the image capture devices are configured to capture images as they are moved through the product storage facility. Accordingly, in some embodiments, a movement system of a task system 106, which can be communicatively coupled with the task system control circuit, is controlled to control the movement of the task system 106 through the product storage facility, and an image capture device of the task system is controlled to capture the images as the task system moves through one or more portions of the product storage facility. Additionally or alternatively, in some embodiments one or more image capture device of a portable user computing device are controlled to capture the images as the user computing device is transported through one or more portions of the product storage facility by a user associated with the user as the user moves through the product storage facility. In some embodiments, one or more task systems are controlled, for example, through the communication of one or more instructions and/or commands to move through the product storage facility, and images can be captured while moving through the facility. This can include capturing images as the task system performs one or more other tasks. Similarly, a central control system can control one or more user computing devices through one or more instructions to direct a worker through the product storage facility and the user computing device can capture images through the image capture device with or without user input.

In step 1006, one or more images captured by one or more image capture devices 102 are received and/or accessed (e.g., through an image database). In step 1008, one or more trained cropping machine learning models are applied to one or more images to identify within and extract from the respective images a portion of image comprising a presumed location label. In step 1010, the portion of the image or a cropped image is received that includes a presumed location label 208 captured by the image capture device 102. Some embodiments include step 1012 where a blur evaluation system 122 is applied to estimate a level of blur of the portion of the image, and the level of blur is evaluated relative to one or more thresholds. When the estimated level of blur has a predefined relationship with a blur threshold, the process enables further evaluation and/or processing of the portion of the image.

In step 1014, one or more deblurring machine learning frameworks are applied to the portion of the image, and a deblurred label image is generated that comprises the presumed location label. Some embodiments, for example, apply a generative adversarial network (GAN) to the portion of the image and generate the deblurred label image. In step 1016, one or more rectification machine learning transform algorithms are applied to the deblurred label image and at least one rectified label image is generated. In some embodiments, the step 1016 is skipped when a level of distortion is identified to be below one or more threshold levels.

In step 1020, one or more recognition machine learning models are applied to the rectified label image to estimate alphanumeric text of the presumed location label. Typically, this includes one or more machine learning OCR models. Some embodiments include optional step 1022 where one or more confidence rules are applied to determine a confidence score of an accuracy of the estimated text of the presumed location label. The application of an exemplary confidence rule can include, as one non-limiting example, the confirmation that the estimated text complies with one or more predefined alphanumeric patterns of multiple alphanumeric characters, one or more known formattings, one or more known fonts, one or more know color schemes, and/or other such know patterns. In some implementations, when the confidence score does not have a predefined relationship with one or more confidence thresholds, the process 1000 disregards the identified text in step 1024 as not corresponding to a location label 208. The process 1000 can terminate, optionally returns to step 1002 to process one or more further images, and/or optionally skips to step 1030 to enable further training. Alternatively, when the confidence score complies with and/or has a predefined relationship with one or more confidence thresholds, the process continues enabling the estimation of the location of the image capture device.

In step 1026, a location estimation system 108 estimates a location within the product storage facility of the presumed location label 208 as a function of the estimated text of the presumed location label relative to known text on known location labels position at respective different known locations within the product storage facility, and/or estimates a location within the product storage facility of the image capture device 102 at the time of capturing the image as a function of the estimated text of the presumed location label relative to known text on known location labels position at respective different known locations within the product storage facility.

In some embodiments, the process 1000 includes step 1030 applied to train and/or re-train repeatedly over time the machine learning models, algorithms, frameworks and/or other architectures utilizing training data stored in and updated within one or more training databases. For example, some embodiments generate and store in a blur training database numerous training sets of actual images and numerous training sets of artificial images. Some of the training sets of actual images, in some implementations, each comprise an actual image of one of the known location labels and at least one artificially blurred version of the one of the known location labels. The actual images can be images captured of known location labels. Similarly, images captured by the one or more image capture devices 102 can be added over time for use in training one or more of the machine learning models, algorithms, frameworks and the like. Further, feedback can provide relevance regarding images such as confirmation that an image was accurately processed to estimate an accurate location, feedback that an image did not include an actual location label, feedback regarding inconsistences, and/or other such feedback. The training sets of the artificial images, in some embodiments, each comprises an artificially generated image of a representative location label based on one or more of known format, font, size and/or other characteristics of alphanumeric characters included on the known location labels, and at least one artificially blurred version of the artificially generated image. A machine learning training system 140 can coupled over the distributed communication network with the machine learning model database and the blur training database, and repeatedly train over time the deblurring machine learning framework utilizing the numerous training sets of actual images and the numerous training sets of artificial images. Similarly training can be applied to the other machine learning models, algorithms and/or frameworks.

Figure 11:
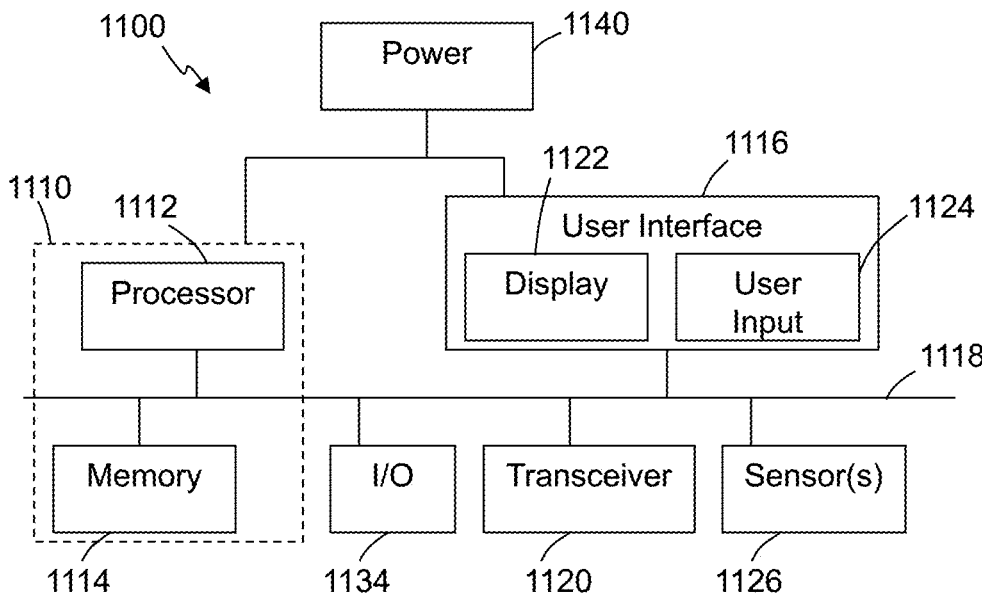
FIG. 11 illustrates an exemplary system for use in implementing methods, techniques, devices, apparatuses, systems, servers, sources and/or components, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 11 illustrates an exemplary system 1100 that may be used for implementing any of the components, circuits, circuitry, systems, functionality, apparatuses, processes, or devices of the location confirmation system 100 and/or other above or below mentioned systems or devices, or parts of such circuits, circuitry, functionality, systems, apparatuses, processes, or devices. For example, the system 1100 may be used to implement some or all of the image capture devices 102, user computing devices 104, task systems 106, location estimation systems 108, image processing systems 110, deblur systems 112, rectification systems 114, OCR systems 116, image cropping systems 120, blur evaluation systems 122, confidence evaluation systems 124, task allocation management systems 136, machine learning training systems 140, and/or other such components, circuitry, functionality and/or devices. However, the use of the system 1100 or any portion thereof is certainly not required.

By way of example, the system 1100 may comprise one or more respective control circuits or processor modules 1112, one or more memory 1114, and one or more communication links, paths, buses or the like 1118. Some embodiments may include one or more user interfaces 1116, and/or one or more internal and/or external power sources or supplies 1140. The control circuit 1112 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1112 can be part of control circuitry and/or a control system 1110, which may be implemented through one or more processors with access to one or more memory 1114 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1100 may be used to implement one or more of the above or below, or parts of, components, circuits, systems, processes and the like. For example, the system may implement the an image capture device 102 with the control circuit being an image capture control circuit, a user computing device 104 with the control circuit being a computing device control circuit, a task system 106 with the control circuit being a task system control circuit, a location estimation system 108 with the control circuit being a location estimation control circuit, an image processing system 110 with the control circuit being an image processing control circuit, a deblur system 112 with the control circuit being a deblur control circuit, a rectification system 114 with the control circuit being a rectification control circuit, an OCR system 116 with the control circuit being an OCR control circuit, an image cropping system 120 with the control circuit being an image cropping control circuit, a blur evaluation system 122 with the control circuit being a blur evaluation capture control circuit, a confidence evaluation system 124 with the control circuit being a confidence evaluation control circuit, a task allocation management system 136 with the control circuit being a task allocation control circuit, a machine learning training system 140 with the control circuit being a training control circuit, and/or other system components.

The user interface 1116 can allow a user to interact with the system 1100 and receive information through the system. In some instances, the user interface 1116 includes a display 1122 and/or one or more user inputs 1124, such as buttons, touch screen, track ball, keyboard, mouse, etc., which can be part of or wired or wirelessly coupled with the system 1100. Typically, the system 1100 further includes one or more communication interfaces, ports, transceivers 1120 and the like allowing the system 1100 to communicate over a communication bus, a distributed computer and/or communication network 126 (e.g., a local area network (LAN), the Internet, wide area network (WAN), etc.), communication link 1118, other networks or communication channels with other devices and/or other such communications or combination of two or more of such communication methods. Further the transceiver 1120 can be configured for wired, wireless, optical, fiber optical cable, satellite, or other such communication configurations or combinations of two or more of such communications. Some embodiments include one or more input/output (I/O) ports 1134 that allow one or more devices to couple with the system 1100. The I/O ports can be substantially any relevant port or combinations of ports, such as but not limited to USB, Ethernet, or other such ports. The I/O interface 1134 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1126 to provide information to the system and/or sensor information that is communicated to another component. The sensors can include substantially any relevant sensor, such as an accelerometer sensor, gyroscope, velocity sensor, distance measurement sensor (e.g., optical units, sound/ultrasound units, etc.), optical-based scanning sensor to sense and read optical patterns (e.g., bar codes), radio frequency identification (RFID) tag reader sensor capable of reading RFID tags in proximity to the sensor, GPS sensor and/or other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1100 comprises an example of a control and/or processor-based system with the control circuit 1112. Again, the control circuit 1112 can be implemented through one or more processors, controllers, central processing units, logic, software and the like. Further, in some implementations the control circuit 1112 may provide multiprocessor functionality.

The memory 1114, which can be accessed by the control circuit 1112, typically includes one or more processor-readable and/or computer-readable media accessed by at least the control circuit 1112, and can include volatile and/or nonvolatile media, such as RAM, ROM, EEPROM, flash memory and/or other memory technology. Further, the memory 1114 is shown as internal to the control system 1110; however, the memory 1114 can be internal, external or a combination of internal and external memory. Similarly, some or all of the memory 1114 can be internal, external or a combination of internal and external memory of the control circuit 1112. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 126. The memory 1114 can store code, software, executables, scripts, data, content, lists, programming, programs, log or history data, user information, customer information, product information, and the like. While FIG. 11 illustrates the various components being coupled together via a bus, it is understood that the various components may actually be coupled to the control circuit and/or one or more other components directly.

Some embodiments utilizes images captured by one or more image capture devices, which can be in motion or stationary, and process the images to repair, enhance, and predict the text of location labels and/or signage such that the text can accurately be identified through the automated system quickly and easily without user interaction, input and/or interpretation. The images can be processed to detect and crop out relevant location labels 208 in the images through one or more machine learning neural networks trained to detect each of multiple different types of location labels 208. Some embodiments evaluate a level of blur prior to proceeding and/or authorizing the deblurring. Typically, the cropped images are deblurred through machine learning models (e.g., Generative Adversarial Network (GAN)). In some instances, the de-blurred portion of the image is further processed through one or more rectifications to de-warped and/or undistort the location label captured in the image through one or more de-warping algorithms. Some embodiments apply one or more OCR algorithms to extract the text from the location label that can be used as location identifying information, which can be used to estimate a location of the location label and/or estimate a location of the image capture device when the image was captured. This location information can be used for numerous potential different functions and/or forwarded to one or more systems for various uses.

In some embodiments the image capture devices 102 are controlled to capture a series of images taken in sequence as the image capture device is moved along portions of the product storage facility (e.g., aisles, roes, racks, cases, etc.). The image capture device 102, in some implementations, can be incorporated into a task system 106, user computing device 104 and/or other mobile systems. Some embodiments additionally or alternatively include and/or utilize images captured by stationary image capture devices positioned at a respective fixed location within the product storage facility. In some implementations, the image capture device 102 is moved at a prescribed distance from products 206 and/or location labels 208. For example, the image capture device when incorporated into some task systems is position proximate a center of an aisle as the task system moves along a center of the aisle. In other instances, an image capture device positioned relatively close to a product (e.g., within a foot) is still typically at least a minimum distance from many location labels (e.g., when the location label is positioned at a predefined height while the image capture device is positioned below that height). The movement, angle of imaging, distance and/or other factors often leaving many items and alphanumeric characters within an image illegible (e.g., images including presumed location labels that are distorted, blurred and/or otherwise degraded). To automate data collection and dissemination some embodiments apply an ensemble of algorithms that repair, enhance, and predict text of location labels 208 such that text of these location labels can be identified and/or read quickly and easily by classification algorithms and transform the image into one or more location information.

In some embodiments, some or all of an image capture device 102, location estimation system 108, image processing system 110, deblur system 112, rectification system 114, OCR system 116, image cropping system 120, blur evaluation system 122, and/or a machine learning training system 140 are incorporated into a user computing device 104 and/or task system 106. This can enable at least some processing to be performed on the user computing device 104 and/or task system 106, while improving network performance, reducing network traffic and potentially increasing speed of performance. In other embodiments, two or more of the image capture devices 102, user computing devices 104, task systems 106, location estimation systems 108, image processing systems 110, deblur systems 112, rectification systems 114, OCR systems 116, image cropping systems 120, blur evaluation systems 122, confidence evaluation systems 124, and machine learning training systems 140 can be cooperated into a system computing system, server or the like. Similarly, one or more of the image capture devices 102, user computing devices 104, task systems 106, location estimation systems 108, image processing systems 110, deblur systems 112, rectification systems 114, OCR systems 116, image cropping systems 120, blur evaluation systems 122, confidence evaluation systems 124, task allocation management systems 136, machine learning training systems 140 can be implemented through multiple different systems geographically distributed over one or more distributed communication networks 126 providing redundancy, duplicative processing to reduce processing overhead, compensate for localized interruptions and/or failures, and other such benefits.

As described above, the location confirmation system 100 includes and/or is communicatively coupled with one or more databases storing information, machine learning models, algorithms and frameworks, applications, training data, and the like. For example, the databases typically include one or more machine learning model databases 130 that store trained, retrained and/or historic machine learning models utilized by one or more of the system components of the location confirmation system 100. Further, embodiments typically further include one or more inventory databases maintaining inventory information of products carried, intended to be carried, previously carried and/or predicted to be carried at one or more product storage facilities. Some embodiments include one or more mapping and/or planogram databases configured to store and repeatedly update over time inventory mapping information based on instructions for product placement. The location confirmation system 100, in some embodiments, further includes one or more machine learning training systems 140 that utilizes historic and/or current training data in training one or more machine learning models, algorithms, frameworks and/or modeling techniques, and repeatedly retrain such machine learning models, algorithms, frameworks and/or modeling techniques over time. Some embodiments further receive feedback information (e.g., notification of incorrect location identification, notification of correct identification of location, subsequent actions and/or movement of a user computing device, task system, user, etc.) that is utilized in repeated re-training over time.

Examples of the machine learning models, algorithms, frameworks and/or modeling techniques can include, but are not limited to YoloV5, MobileNetv2, EfficientNetv2, Deep-Sort, one or more neural networks, generative adversarial networks (GAN), deep stacking networks (DSN), Tensor deep stacking networks, convolutional neural network, probabilistic neural network, autoencoder or Diabolo network, linear regression, support vector machine, Naïve Bayes, logistic regression, K-Nearest Neighbors (kNN), decision trees, random forest, gradient boosted decision trees (GBDT), K-Means Clustering, hierarchical clustering, DB SCAN clustering, principal component analysis (PCA), and/or other such models, networks and/or algorithms.

The training data is used to train and retrain the machine learning models, algorithms, frameworks and/or other such architectures through one or more model training systems 140 and/or servers. These training systems and/or servers can be implemented by the product storage facility, a retail company, a third party service and/or other entity. The trained models can be maintained in one or more databases and some or all of these models can be distributed system components as needed.

As described above, in some embodiments, the image capture device 102 is implemented in and/or incorporated into a motorized image capture device and/or motorized mobile task system 106. The image capture device 102 does not necessarily need an autonomous motorized wheel-based and/or track-based system to move around the product storage facility 105, and may instead be moved (e.g., driven, pushed, carried, worn, etc.) by a human operator, or may be movably coupled to a track system (which may be above the floor level or at the floor level) that permits the image capture device 102 to move around the product storage facility 105 while capturing images of various product storage areas of the product storage facility. A motorized image capture device can include a housing that contains (partially or fully) or at least supports and carries a number of components. These components can include, for example, one or more control units comprising one or more control circuits that control the general operations of the motorized image capture device (notably, in some implementations, may control the general operations of the image capture device 102). Accordingly, the control unit also includes one or more memory coupled to the control circuit and that stores, for example, computer program code, operating instructions and/or useful data, which when executed by the control circuit implement the operations of the image capture device.

The control circuit can operably couples to one or more motorized wheel systems, treads, etc., which may be optional. This motorized wheel system can function as a locomotion system to permit the image capture device 102 to move within the product storage facility 105 (thus, the motorized wheel system may be more generically referred to as a locomotion system). Generally, this motorized wheel system may include at least one drive wheel (i.e., a wheel that rotates around a horizontal axis) under power to thereby cause the image capture device 102 to move through interaction with, e.g., the floor of the product storage facility. The motorized wheel system can include any number of rotating wheels and/or other alternative floor-contacting mechanisms (e.g., tracks, etc.) as may be desired and/or appropriate to the application setting.

The motorized wheel system may also include a steering mechanism of choice. One simple example may comprise one or more wheels that can swivel about a vertical axis to thereby cause the moving image capture device 102 to turn as well. Various examples of motorized wheel and track systems are known in the art. Further elaboration in these regards is not provided here for the sake of brevity save to note that the aforementioned control circuit is configured to control the various operating states of the motorized wheel system to thereby control when and how the motorized wheel system operates.

In some embodiments, the control circuit can operably couple one or more wireless transceivers that operate according to any known wireless protocol. This wireless transceiver can comprise, for example, a Wi-Fi-compatible and/or Bluetooth-compatible transceiver (or any other transceiver operating according to known wireless protocols) that can wirelessly communicate with other components of the location confirmation system 100, and/or external systems. So configured, the control circuit of the image capture device 102 can provide information to receive information and/or movement instructions. These teachings will accommodate using any of a wide variety of wireless technologies as desired and/or as may be appropriate in a given application setting. These teachings will also accommodate employing two or more different wireless transceivers, if desired.

The control circuit, in some implementations, can also couple with one or more onboard sensors of the image capture device 102 and/or other sensors. These teachings will accommodate a wide variety of sensor technologies and form factors. According to some embodiments, the image capture device 102 can include one or more sensors including but not limited to an optical sensor, a photo sensor, an infrared sensor, a 3-D sensor, a depth sensor, a digital camera sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

In some embodiments, an audio input (such as a microphone) and/or an audio output (such as a speaker) can also operably couple to the control circuit. So configured, the control circuit can provide a variety of audible sounds to thereby communicate (e.g., with workers, customers, etc.) at the product storage facility 105 or other motorized image capture devices 102 moving around the product storage facility. These audible sounds can include any of a variety of tones and other non-verbal sounds. Such audible sounds can also include, in lieu of the foregoing or in combination therewith, pre-recorded or synthesized speech.

The audio input, in turn, provides a mechanism whereby, for example, a user (e.g., a worker at the product storage facility 105, customer, etc.) provides verbal input to the control circuit. That verbal input can comprise, for example, instructions, inquiries, or information. So configured, a user can provide, for example, an instruction and/or query (e.g., where is pallet number so-and-so?, how many products are stocked on pallet number so-and-so? etc.) to the control circuit via the audio input.

In some embodiments, the image capture device 102 can include a rechargeable power source such as one or more batteries, capacitors, other such rechargeable sources or a combination of two or more of such sources. The power provided by the rechargeable power source can be made available to whichever components of the image capture device 102 utilizing electrical energy. The motorized image capture device 102 in some implementations includes a plug or other electrically conductive interface that the control circuit can utilize to automatically connect to an external source of electrical energy to thereby recharge the rechargeable power source.

In some embodiments, the motorized image capture device 102 includes an input/output (I/O) device that is coupled to the control circuit. The I/O device allows an external device to couple to the control unit. The function and purpose of connecting devices will depend on the application. In some examples, devices connecting to the I/O device may add functionality to the control unit, allow the exporting of data from the control unit, allow the diagnosing of the motorized image capture device 102, and so on.

In some embodiments, the motorized image capture device 102 includes a user interface including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface may work together with or separate from any user interface implemented at an optional user interface unit or user device (such as a smart phone or tablet device) usable by a worker at the product storage facility. In some embodiments, the user interface is separate from the image capture device, e.g., in a separate housing or device wired or wirelessly coupled to the image capture device 102. In some embodiments, the user interface may be implemented in a mobile user device carried by a person (e.g., worker at product storage facility 105, customer, etc.) and configured for communication over the network 126 with the image capture device 102.

In some embodiments, the motorized image capture device 102 may be controlled by or through one or more user computing devices 104 or a user (e.g., by driving or pushing the image capture device 102 or sending control signals to the image capture device 102) on-site at the product storage facility 105 or off-site. This is due to the architecture of some embodiments where the user computing device 104 outputs the control signals to the motorized image capture device 102. These controls signals can originate at any electronic device in communication with the motorized image capture device 102 and/or network 126. For example, the movement signals sent to the motorized image capture device 102 may be movement instructions determined by the user computing device 104, a routing system, etc.; commands received at the user computing device 104 from a user; and commands received from a remote user not located at the product storage facility 105.

The motorized image capture system, in some embodiments, the control unit includes a memory coupled to the control circuit and that stores, for example, computer program code, operating instructions and/or useful data, which when executed by the control circuit implement the operations of the image capture device. The control circuit can comprise a fixed-purpose hard-wired platform or can comprise a partially or wholly programmable platform. These architectural options are well known and understood in the art and require no further description here. This control circuit is configured (for example, by using corresponding programming stored in the memory as will be well understood by those skilled in the art) to carry out one or more of the steps, actions, and/or functions described herein. The memory may be integral to the control circuit or can be physically discrete (in whole or in part) from the control circuit as desired. This memory can also be local with respect to the control circuit (where, for example, both share a common circuit board, chassis, power supply, and/or housing) or can be partially or wholly remote with respect to the control circuit. This memory can serve, for example, to non-transitorily store the computer instructions that, when executed by the control circuit, cause the control circuit to behave as described herein.

In some embodiments, the control circuit may be communicatively coupled to one or more trained computer vision/machine learning/neural network modules/models to perform at some of the functions. For example, the control circuit may be trained to process one or more images of product storage areas at the product storage facility 105 to detect and/or recognize one or more products using one or more machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning module/model includes a computer program code stored in a memory and/or executed by the control circuit to process one or more images.

It is noted that not all of the above listed components are required to be included in all embodiments of the motorized image capture device 102. That is, some components may be optional depending on the implementation of the motorized image capture device 102. It will be appreciated that while the image capture device 102 is a motorized robotic device capable of moving about the product storage facility while being controlled remotely and without being controlled by an onboard human operator, in some embodiments, the image capture device 102 may be configured to permit an onboard human operator (i.e., driver) to direct the movement of the image capture device 102 about the product storage facility.

In some embodiments, systems and corresponding methods performed by the systems, comprise: a machine learning model database storing a set of two or more machine learning models; a deblur system communicatively coupled over a distributed communication network with the machine learning model database, wherein the deblur system is configured to receive a portion of a first image comprising a presumed location label captured by the image capture device configured to capture images within a product storage facility, and apply at least a deblurring machine learning framework to the portion of the first image and generate a first deblurred label image comprising the presumed location label; a rectification system communicatively coupled over a distributed communication network with the machine learning model database, wherein the rectification system is configured to apply a rectification machine learning transform algorithm to the first deblurred label image to generate a first rectified label image; an optical character recognition (OCR) system communicatively coupled over a distributed communication network with the machine learning model database, wherein the OCR system is configured to apply a recognition machine learning model to the first rectified label image to estimate alphanumeric text of the presumed location label; and a location estimation system configured to estimate a location within the product storage facility of the presumed location label as a function of the estimated text of the presumed location label relative to known text on known location labels position at respective different known locations within the product storage facility.

Some embodiments provide methods of confirming locations within a product storage facility, comprising: storing, in a machine learning model database, a set of two or more machine learning models; receiving images captured by an image capture device configured to capture the images; receiving a portion of a first image, of the images, wherein the portion of the first image comprises a presumed location label captured by the image capture device; applying a deblurring machine learning framework to the portion of the first image and generating a first deblurred label image comprising the presumed location label; applying a rectification machine learning transform algorithm to the first deblurred label image and generating a first rectified label image; applying a recognition machine learning model to the first rectified label image to estimate alphanumeric text of the presumed location label; and estimating a location within a product storage facility of the image capture device at the time of capturing the first image as a function of the estimated text of the presumed location label relative to known text on known location labels position at respective different known locations within the product storage facility.

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; and entitled CLUSTERING OF ITEMS WITH HETEROGENEOUS DATA POINTS filed on Oct. 11, 2022, application Ser. No. 17/963,903.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An image based retail location confirmation system, comprising:
  a machine learning model database storing a set of two or more machine learning models;
  a deblur system communicatively coupled over a distributed communication network with the machine learning model database, wherein the deblur system is configured to receive a portion of a first image comprising a first presumed location label and a second presumed location label captured by an image capture device configured to capture images within a product storage facility, and apply at least a deblurring machine learning framework to the portion of the first image and generate a first deblurred label image comprising the first presumed location label and the second presumed location label;
  a rectification system communicatively coupled over the distributed communication network with the machine learning model database, wherein the rectification system is configured to apply a rectification machine learning transform algorithm to justify the first deblurred label image according to a known shape of location labels to thereby generate a first rectified label image;
  an optical character recognition (OCR) system communicatively coupled over the distributed communication network with the machine learning model database, wherein the OCR system is configured to:
    apply a recognition machine learning model to the first rectified label image to estimate text of the first presumed location label and the second presumed location label; and
    verify that identified patterns of the first presumed location label and the second presumed location label conform with a known location label pattern for location labels; and
  a location estimation system configured to;
    select one of the first presumed location label and the second presumed location label as a selected presumed location label based on which one of the first presumed location label and the second presumed location label is assigned a higher prioritized value for determining location; and
    estimate a location within the product storage facility of the selected presumed location label as a function of the estimated text of the selected presumed location label relative to known text on known location labels positioned at respective different known locations within the product storage facility.

2. The system of claim 1, further comprising:
an image cropping system communicatively coupled over the distributed communication network with the machine learning model database, wherein the image cropping system is configured to apply a trained cropping machine learning model to identify within and extract from the first image the portion of the first image comprising the first presumed location label the second presumed location label.

3. The system of claim 2, further comprising:
a blur evaluation system configured to estimate a level of blur of the portion of the first image and enable the deblur system to generate the first deblurred label image when the estimated level of blur has a predefined relationship with a blur threshold.

4. The system of claim 2, further comprising:
a confidence evaluation system configured to apply at least one confidence rule to determine a confidence score of an accuracy of the estimated text of the first presumed location label and the second presumed location label; and
enable the location estimation system configured to estimate the location of the image capture device when the confidence score has a predefined relationship with a confidence threshold, and prevent the location estimation system from estimating locations of the image capture device when other confidence scores do not have the predefined relationship with the confidence threshold.

5. The system of claim 4, wherein the confidence evaluation system in applying the at least one confidence rule is configured to confirm that the estimated text complies with a predefined alphanumeric pattern of multiple alphanumeric characters.

6. The system of claim 4, further comprising:

a mobile task system comprising the image capture device, a task system, and a movement system communicatively coupled with the task system, wherein the task system is configured to implement code to control the movement system to control movement of the task system through the product storage facility;

wherein the image capture device is configured to capture the images as the task system moves through one or more portions of the product storage facility.

7. The system of claim 4, further comprising:

a portable user computing device comprising the image capture device, wherein the portable user computing device is configured to be transported by a user associated with the portable user computing device as the user moves through the product storage facility, and wherein the image capture device is configured to capture the images as the portable user computing device is transported through one or more portions of the product storage facility.

8. The system of claim 4, wherein the deblur system applying the deblurring machine learning framework is configured to apply a generative adversarial network (GAN) to the portion of the first image and generate the first deblurred label image comprising the first presumed location label and the second presumed location label.

9. The system of claim 4, further comprising:

a blur training database storing numerous training sets of actual images and numerous training sets of artificial images, wherein the numerous training sets of actual images each comprise: an actual image of one of the known location labels and at least one artificially blurred version of the one of the known location labels; and wherein the numerous training sets of artificial images each comprises: an artificially generated image of a representative location label based on known format, font and size of alphanumeric characters included on the known location labels, and at least one artificially blurred version of the artificially generated image; and a machine learning training system communicatively coupled over the distributed communication network with the machine learning model database and the blur training database, wherein the machine learning training system is configured to repeatedly train over time the deblurring machine learning framework utilizing the numerous training sets of actual images and the numerous training sets of artificial images.

10. A method of confirming locations within a product storage facility, comprising:

storing, in a machine learning model database, a set of two or more machine learning models;

receiving images captured by an image capture device configured to capture the images within the product storage facility;

receiving a portion of a first image, of the images, wherein the portion of the first image comprises a first presumed location label and a second presumed location label captured by the image capture device;

applying a deblurring machine learning framework to the portion of the first image and generating a first deblurred label image comprising the first presumed location label and the second presumed location label;

applying a rectification machine learning transform algorithm to justify the first deblurred label image according to a known shape of location labels and thereby generating a first rectified label image;

applying a recognition machine learning model to the first rectified label image to:

estimate text of the first presumed location label and the second presumed location label; and verify that identified patterns of the first presumed location label and the second presumed location label conform with a known location label pattern for location labels;

selecting one of the first presumed location label and the second presumed location label as a selected presumed location label based on which one of the first presumed location label and the second presumed location label is assigned a higher prioritized value for determining location; and estimating a location within the product storage facility of the selected presumed location label as a function of the estimated text of the selected presumed location label relative to known text on known location labels position at respective different known locations within the product storage facility.

11. The method of claim 10, further comprising:

applying a trained cropping machine learning model to identify within and extract from the first image the portion of the first image comprising the first presumed location label and the second presumed location label.

12. The method of claim 11, further comprising:

estimating, by a blur evaluation system, a level of blur of the portion of the first image and enabling the generating of the first deblurred label image when the estimated level of blur has a predefined relationship with a blur threshold.

13. The method of claim 11, further comprising:

applying at least one confidence rule and determining a confidence score of an accuracy of the estimated text of the first presumed location label and the second presumed location label; and enabling the estimating of the location of the image capture device when the confidence score has a predefined relationship with a confidence threshold, and preventing the estimation of locations of the image capture device when other confidence scores do not have the predefined relationship with the confidence threshold.

14. The method of claim 13, wherein the applying the at least one confidence rule comprises confirming that the estimated text complies with a predefined alphanumeric pattern of multiple alphanumeric characters.

15. The method of claim 13, further comprising:

controlling a movement system of a mobile task system in controlling movement of the mobile task system through the product storage facility, wherein the mobile task system comprises the image capture device; and controlling the image capture device to capture the images as the mobile task system moves through one or more portions of the product storage facility.

16. The method of claim 13, further comprising:

controlling the image capture device of a portable user computing device to capture the images as the portable user computing device is transported through one or more portions of the product storage facility by a user associated with the portable user computing device as the user moves through the product storage facility.

17. The method of claim 13, wherein the applying the deblurring machine learning framework comprises applying a generative adversarial network (GAN) to the portion of the first image and generating the first deblurred label image comprising the first presumed location label and the second presumed location label.

18. The method of claim 13, further comprising:

generating and storing in a blur training database storing numerous training sets of actual images and numerous training sets of artificial images, wherein the numerous training sets of actual images each comprise: an actual image of one of the known location labels and at least one artificially blurred version of the one of the known location labels; and wherein the numerous training sets of artificial images each comprises: an artificially generated image of a representative location label based on known format, font and size of alphanumeric characters included on the known location labels, and at least one artificially blurred version of the artificially generated image; and repeatedly training over time the deblurring machine learning framework utilizing the numerous training sets of actual images and the numerous training sets of artificial images.

* * * * *